(12) United States Patent
Mysore Veera et al.

(10) Patent No.: US 10,628,006 B2
(45) Date of Patent: Apr. 21, 2020

(54) ELECTRONIC DEVICE AND METHOD FOR MANAGING APPLICATIONS ON AN ELECTRONIC DEVICE

(71) Applicant: Samsung Electronics Co., Ltd., Suwon-si, Gyeonggi-do (KR)

(72) Inventors: Ragava Mysore Veera, Bangalore (IN); Karthikeyan Subramani, Bangalore (IN); Barath Raj Kandur Raja, Bangalore (IN); Venkata Sreenath Yalamarthi, Bangalore (IN); Kamal Krishna, Bangalore (IN); Indira Preethi Jain Gargatti Ajith, Bangalore (IN); Sharath Venkataram Bangalore Shiva Kumar, Bangalore (IN); Sujay Srinivasa Murthy, Bangalore (IN); Anup Kumar Kandhari, Bellary (IN); Abhishek Kumar Bansal, Bathinda (IN); Dhruv Modi, Bangalore (IN); Shwetank Choudhary, Ashoknagar (IN); Sharmila Mani, Bangalore (IN); Ravi Krishnan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 15/151,977

(22) Filed: May 11, 2016

(65) Prior Publication Data
US 2016/0334970 A1 Nov. 17, 2016

(30) Foreign Application Priority Data

May 11, 2015 (IN) .......................... 2384/CHE/2015
Dec. 2, 2015 (IN) .......................... 2384/CHE/2015

(51) Int. Cl.
*G06F 3/0484* (2013.01)
*G06F 3/0481* (2013.01)
(Continued)

(52) U.S. Cl.
CPC ........ *G06F 3/04842* (2013.01); *G06F 3/0481* (2013.01); *G06F 9/445* (2013.01);
(Continued)

(58) Field of Classification Search
CPC .. G06F 3/04842; G06F 3/0481; G06F 9/4446; G06F 9/445; G06F 9/44505; G06F 9/44526; G06F 3/048
See application file for complete search history.

(56) References Cited

U.S. PATENT DOCUMENTS 7,149,550 B2 12/2006 Kraft et al.
7,679,534 B2 3/2010 Kay et al.
(Continued)

FOREIGN PATENT DOCUMENTS

GB 2498554 A 7/2013
GB 2528635 A 2/2016

OTHER PUBLICATIONS

European Office Action dated Dec. 5, 2018, issued in a counterpart European application No. 16169254.6-1216.

*Primary Examiner* — Mandrita Brahmachari
(74) *Attorney, Agent, or Firm* — Jefferson IP Law, LLP

(57) ABSTRACT

A method and apparatus for managing applications by an electronic device are provided. The method and apparatus include identifying, by a processor, a secondary application based on an application executed on the electronic device or content included in the application, displaying a representation corresponding to the secondary application on the electronic device, selecting the representation based on an (Continued)

input, and invoking the secondary application corresponding to the selected representation on the electronic device.

20 Claims, 33 Drawing Sheets

(51) Int. Cl.
*G06F 9/445* (2018.01)
*G06F 9/451* (2018.01)
*G06F 3/048* (2013.01)

(52) U.S. Cl.
CPC ...... *G06F 9/44505* (2013.01); *G06F 9/44526* (2013.01); *G06F 9/453* (2018.02); *G06F 3/048* (2013.01)

(56) References Cited

U.S. PATENT DOCUMENTS

| | | | |
|---|---|---|---|
| 8,180,630 B2 | 5/2012 | Goud et al. | |
| 2005/0165712 A1 | 7/2005 | Araki et al. | |
| 2006/0247915 A1 | 11/2006 | Bradford et al. | |
| 2009/0100367 A1* | 4/2009 | Dargahi | G06Q 10/00 715/769 |
| 2009/0106695 A1 | 4/2009 | Perry et al. | |
| 2010/0161733 A1 | 6/2010 | Bower et al. | |
| 2010/0257479 A1* | 10/2010 | Do | G06F 9/453 715/780 |
| 2011/0093580 A1 | 4/2011 | Nagasaka et al. | |
| 2011/0314145 A1* | 12/2011 | Raleigh | H04L 41/0893 709/224 |
| 2012/0017178 A1* | 1/2012 | Mulloy | G06F 9/4443 715/835 |
| 2012/0079504 A1 | 3/2012 | Maciocci et al. | |
| 2013/0019182 A1* | 1/2013 | Gil | G06F 3/0482 715/738 |
| 2013/0132904 A1* | 5/2013 | Primiani | G06F 3/048 715/834 |
| 2013/0326340 A1* | 12/2013 | Woo | G06F 3/0484 715/243 |
| 2014/0040226 A1 | 2/2014 | Sadhukha et al. | |
| 2014/0053078 A1* | 2/2014 | Kannan | H04W 4/023 715/748 |
| 2014/0223372 A1* | 8/2014 | Dostie | G06F 3/0482 715/813 |
| 2014/0230037 A1* | 8/2014 | Nicholas, III | G06F 3/0481 726/7 |
| 2014/0324946 A1* | 10/2014 | Zhang | H04L 67/1095 709/203 |
| 2015/0331557 A1* | 11/2015 | Fish | G06F 3/04847 715/773 |

* cited by examiner

ELECTRONIC DEVICE AND METHOD FOR MANAGING APPLICATIONS ON AN ELECTRONIC DEVICE

CROSS-REFERENCE TO RELATED APPLICATION(S)

This application claims the benefit under 35 U.S.C. § 119(a) of an Indian Provisional patent application filed on May 11, 2015 in the Indian Intellectual Property Office and assigned Serial number 2384/CHE/2015 and an Indian patent application filed on Dec. 2, 2015 in the Indian Intellectual Property Office and assigned Serial number 2384/CHE/2015, the entire disclosure of each of which is hereby incorporated by reference.

TECHNICAL FIELD

The present disclosure relates to a method and device for identifying one or more secondary applications related to an application and/or content included in the application, and non-transitory computer readable storage medium storing program instructions for performing the method. The application may be displayed on a screen of an electronic device or running in the background of the electronic device.

BACKGROUND

Many instant messaging applications provide a variety of supplemental features including, for example, the ability to share web links; images; music; files, etc. between devices; communication (over the internet); and information streaming (streaming of real-time or near-real-time information such as stock quotes and news headlines).

In existing systems and methods, it becomes cumbersome for user to navigate between multiple different applications for performing a task. In an example, if the user wants to transfer a file from one application to another application, the user has to switch between applications in order to do so, thus resulting inhibiting the user experience.

Existing system fails to provide both a current application being used by the user and an additional application for the current application within the same screen. When switching between applications, the user can only view the current content of one application at a time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and methods for managing applications.

Another aspect of the present disclosure is to provide a method of identifying one or more secondary applications related to an application displayed on a screen of an electronic device and/or content included in the displayed application.

Another aspect of the present disclosure is to provide a method of dynamically positioning a representation of the secondary application on a screen of the electronic device.

Another aspect of the present disclosure is to provide a method that allows the user of the electronic device to select the representation to display the secondary application on the screen of the electronic device and then perform actions in the secondary application.

In accordance with an aspect of the present disclosure, a method implemented in an electronic device is provided. The method includes identifying, by a processor, at least one secondary application based on at least one of an application executed on the electronic device and content included in the application, displaying at least one representation corresponding to the at least one secondary application on the electronic device, selecting one of the at least one representation based on an input, and invoking one of the at least one secondary application corresponding to the selected representation on the electronic device.

In accordance with another aspect of the present disclosure, an electronic device is provided. The electronic device includes a controller configured to identify at least one secondary applications based on at least one of an application executed on the electronic device and content included in the application, and a display configured to display at least one representation corresponding to the at least one secondary application on the electronic device, wherein the controller is configured to select one of the at least one representation based on an input, and invoke one of the at least one secondary application corresponding to the selected representation on the electronic device.

In accordance with another aspect of the present disclosure, a non-transitory computer readable storage medium storing program instructions, which when executed by a computer, performs a method. The method includes identifying, by a processor, at least one secondary application based on at least one of an application executed on an electronic device and content included in the application, displaying at least one representation corresponding to the at least one secondary application on the electronic device, selecting one of the at least one representation based on an input, and invoking one of the at least one secondary application corresponding to the selected representation on the electronic device.

Other aspects, advantages, and salient features of the disclosure will become apparent to those skilled in the art from the following detailed description, which, taken in conjunction with annexed drawings discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
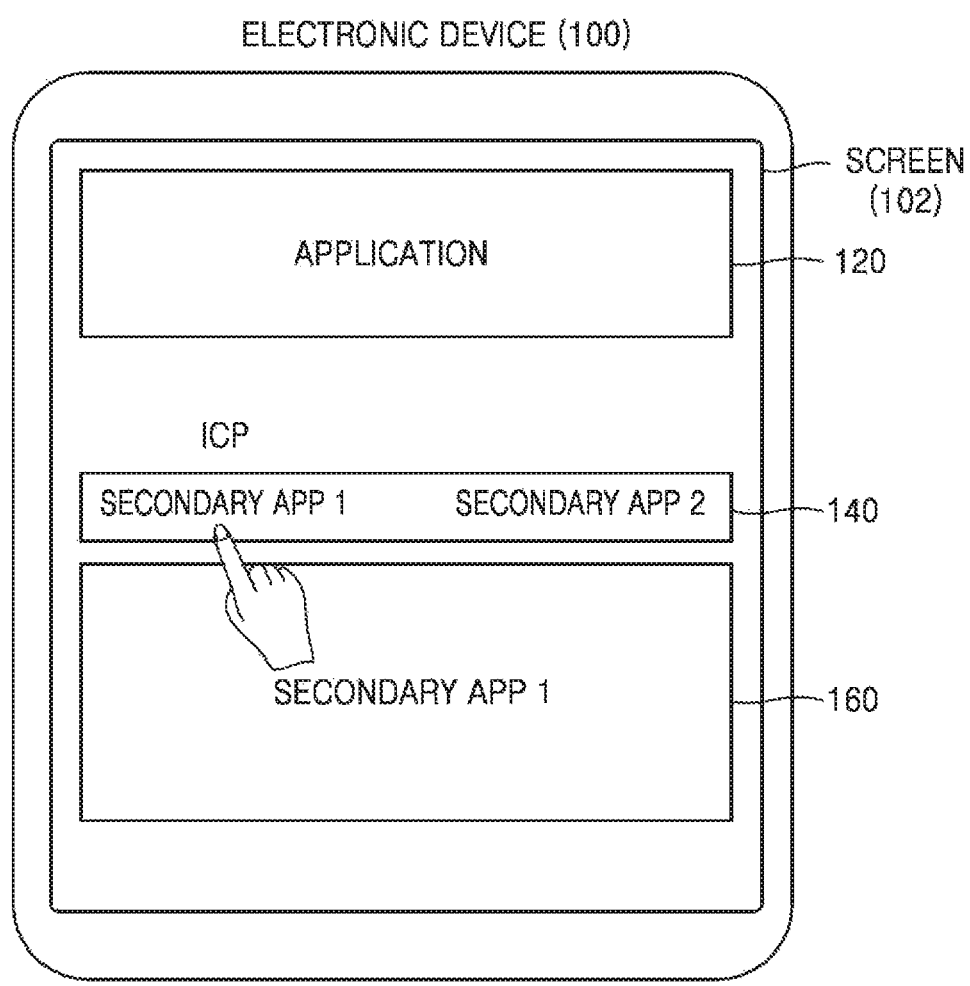
FIG. 1A illustrates an electronic device in which one or more secondary applications are identified based on an application displayed on a screen of the electronic device and/or content in the application, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein provide a method of identifying a secondary application based on an application displayed on an electronic device and/or content in the application. The method includes displaying a representation of the secondary application on the screen of the electronic device. Further, the method includes invoking the secondary application on the screen based on an input selecting the representation.

Unlike the conventional systems and methods, the proposed method avoids screen switching when performing a task involving multiple applications, thereby allowing a user to perform the task quickly. The proposed method provides a unique experience of cross application interaction and efficiently utilizes the screen area of the electronic device. The proposed method provides a centralized control of the multiple applications. The proposed method provides efficient utilization of system resources and simplified interaction.

Referring to the drawings, repeated descriptions of elements whose reference numerals are repeated throughout the drawings are omitted.

FIG. 1A illustrates an electronic device 100 displaying an application and content included in the application on a screen 102 of the electronic device 100 and identifying one or more secondary applications related to the application or the content, according to embodiments disclosed herein. In an example, the application displayed in a display area 120 on the screen 102 may be a social networking application, a job search application, or the like. In an example, these applications may be installed by a user of the electronic device or pre-installed.

Referring to FIG. 1A, the electronic device 100 may identify one or more secondary applications related to an application running in the background and/or content included in the background application (for example, identifying and opening a messaging application on a friend's birthday, identifying and opening a messaging application or voice communication application when a user is at home according to a global positioning system (GPS) application running in the background but is supposed to be at a scheduled meeting saved in a calendar application).

The electronic device 100 may be, for example, but is not limited to, a desktop computer, a cellular phone, a smart phone, a personal digital assistant (PDA), a laptop computer, a digital picture frame, a tablet device, or the like. After identifying one or more secondary applications, the electronic device 100 may display representations of the one or more secondary applications in a display area 140 on the screen 102. The representations may be, for example, an icon, a symbol, an image, text, or the like corresponding to the secondary applications, but are not limited thereto. In an embodiment, the one or more representations of the secondary applications may be included in an interactive context panel (ICP) displayed on the screen 102 of the electronic device 100. The ICP may be, for example, rectangular, circular, square, or strip shaped, but is not limited thereto.

In an embodiment, the ICP may be a smart panel integrated into or displayed on the screen 102.

In an embodiment, in response to a user input selecting one of the one or more representations displayed in a display area 140 on the screen 102 of the electronic device 100, the electronic device 100 may invoke a secondary application corresponding to the selected representation. In an embodiment, the electronic device 100 selects one of the one or more representations based on a touch input (e.g., long press on an icon, a symbol, an image, text, etc.) or hovering on the representations on the display area 140.

In an embodiment, the electronic device 100 may automatically invoke a secondary application corresponding to one of the displayed representations, without a user input, based on settings preset by the user. In an embodiment, the electronic device 100 may invoke one of the at least one secondary application based on a user input (including a gesture, voice, etc.)

In an embodiment, after invoking the secondary application, the electronic device 100 may represent the secondary application and the application on a multi window, i.e. display areas 120, 160 on a screen 102 of the electronic device.

After invoking the secondary application on the screen 102, the electronic device 100 may automatically input content of the displayed application to the secondary application. Alternatively, the electronic device 100 may automatically execute a function in the secondary application based on the content of the displayed application.

For example, the secondary application may access content received by the electronic device 100 via the displayed application, or the secondary application may automatically open a website, perform a search query, update a social networking site (SNS) status of the user, etc. based on content (for example, textual or graphical content) received by the electronic device 100 via the displayed application.

After the electronic device 100 automatically inputs the content of the displayed application to the secondary application, the electronic device 100 may perform an action via the secondary application (e.g., completing an action via the secondary application, or redirecting the secondary application) in response to a user input. After completing the action via the secondary application, the electronic device 100 may provide a prompt or notification (not illustrated) to the user for choosing whether to continue using the secondary application, or return to the displayed application, or use a supplemental application. Additionally, the electronic device 100 may automatically return to the displayed application or invoke the supplemental application after completing the action via the secondary application.

Unlike conventional systems, in an embodiment, the electronic device dynamically identifies multiple application features based on the content (textual or graphical content) of the application in real time. An embodiment provides an effective utilization of the screen 102 by intelligently populating the ICP with the application entry points and dynamically positions the ICP based on an area of the screen 102. The ICP may be sliding, floating, docking, overlaying, resizing, or moving over the screen 102 of the electronic device 100. An embodiment may overlay the ICP on a top portion of a transparent or virtual keypad. In an embodiment, the electronic device may navigate between applications installed on the electronic device 100 using the ICP.

Figure 1B:
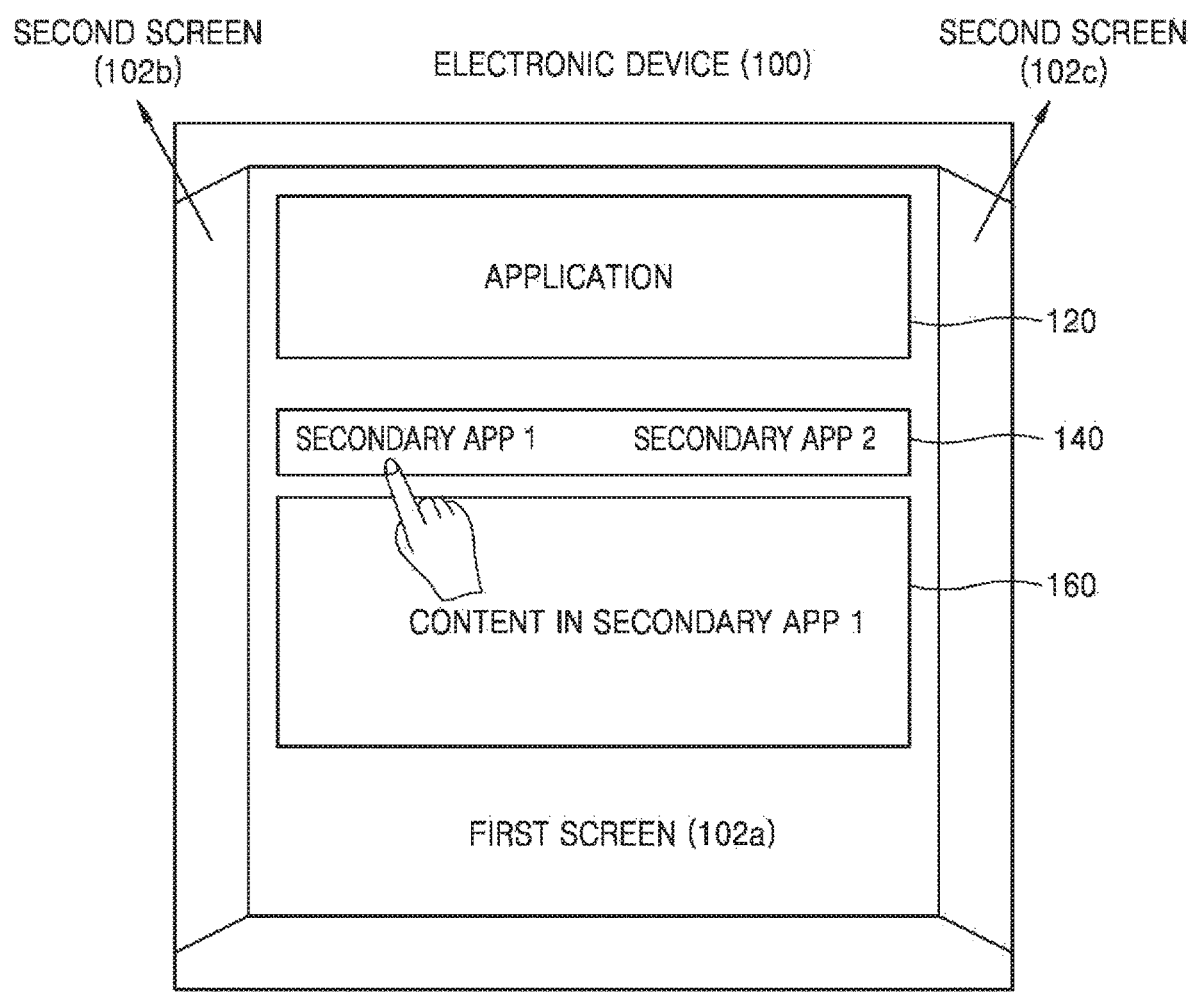
FIG. 1B illustrates an electronic device having multiple screens in which one or more secondary applications are identified based on an application displayed on a screen of the electronic device and/or content in the application are identified, according to an embodiment of the present disclosure.

FIG. 1B illustrates an example where the electronic device 100 displays applications on multiple screens 102a, 102b, and 102c in which one or more applications related to the displayed applications and/or content included in the displayed applications are identified, according to the embodiments disclosed herein. In an embodiment, one or more of screens 102a through 102c are included in the electronic device 100. In an embodiment, one or more of screens 102a through 102c is attached to the electronic device 100. In an embodiment, screens 102a through 102c are all attached to one side of the electronic device 100.

Referring to FIG. 1B, screens 102a through 102c are each attached on one side of the electronic device 100. The functionality and operation of the electronic device 100 are explained in conjunction with FIG. 1A.

Embodiments of the electronic device 100 are not limited to FIG. 1A and FIG. 1B. Further, the electronic device 100 can include any number of hardware or software components communicating with each other. For example, the component may be, but is not limited to, a process running in a controller or processor which includes hardware circuitry configured for operation, an object, an executable process, a thread of execution, a program, or a computer. By way of illustration, both an application running on a device and the device itself may be a component. Further, hereinafter the screen of the electronic device will be referred to as screen 102.

An advantage of the embodiments over conventional systems and methods is that screen switching for performing tasks involving multiple applications may be avoided, thus allowing tasks to be completed more quickly and efficiently and resulting in an enhanced user experience. The electronic device 100 according to the embodiments provides cross application interaction which efficiently utilizes the area of the screen 102 of the electronic device 100.

Figure 1C:
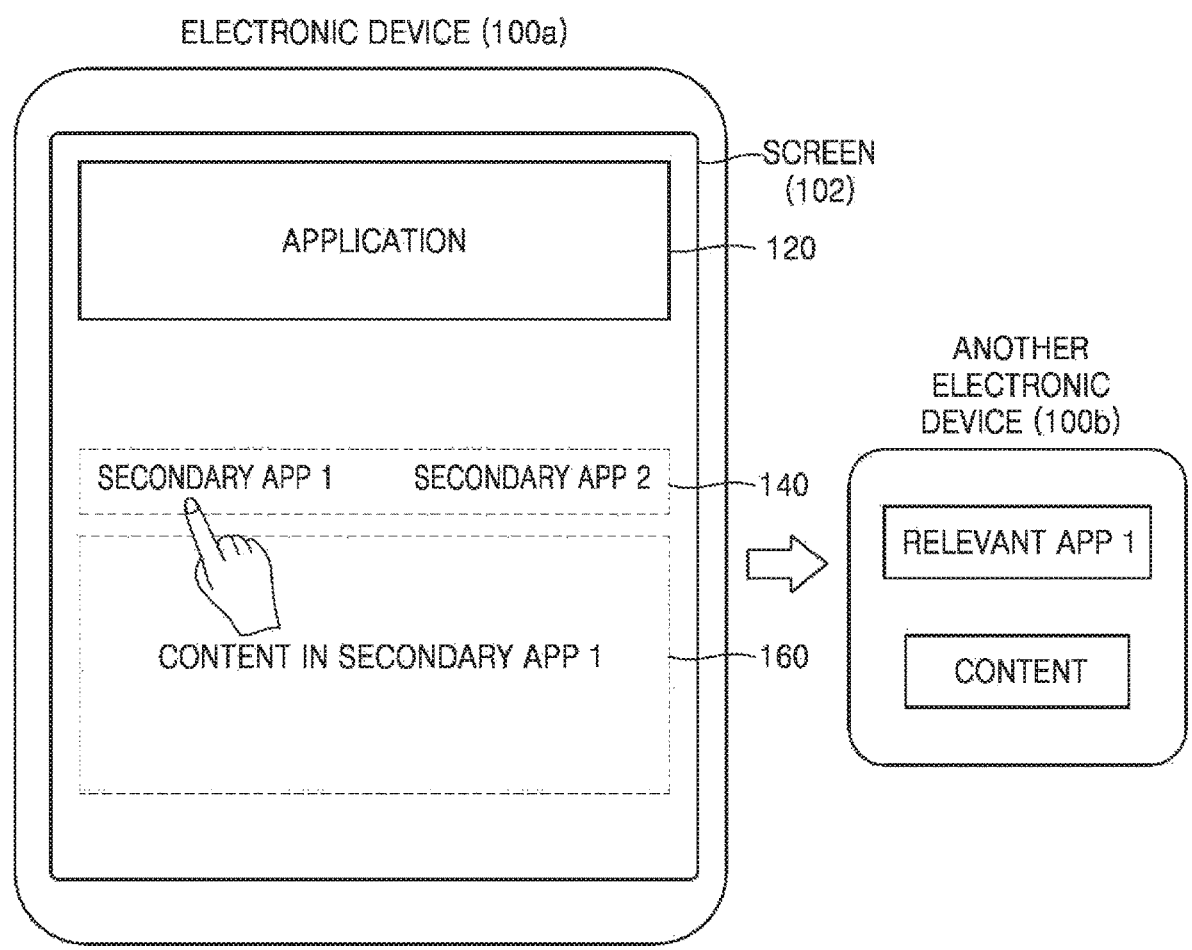
FIG. 1C illustrates among other things, a high level overview of a system for positioning a representation of a secondary application on a screen of an electronic device, according to an embodiment of the present disclosure.

FIG. 1C illustrates, among other things, a high level overview of a system for dynamically positioning a representation of a secondary application on a display area 140 on a screen 102 of an electronic device 100a, according to the embodiments disclosed herein. The functionality and operation of the electronic device 100a are explained in conjunction with FIG. 1A. The system may invoke the identified secondary application on the screen 102 of the electronic device 100a or in another electronic device (e.g., electronic device 100b) as illustrated in FIG. 1C. In an embodiment, the electronic device 100a transfers the secondary application along with content included in the application to the electronic device 100b.

Embodiments of the system are not limited to FIG. 1C. Further, the system can include any number of electronic devices 100a and 100b along with other hardware or software components communicating with each other. For example, the component may be, but is not limited to, a process running in the controller or processor, an object, an executable process, a thread of execution, a program, or a computer. By way of illustration, both an application running on a device and the device itself may be a component. Hereinafter, the electronic device will be referred to as electronic device 100.

Figure 2A:
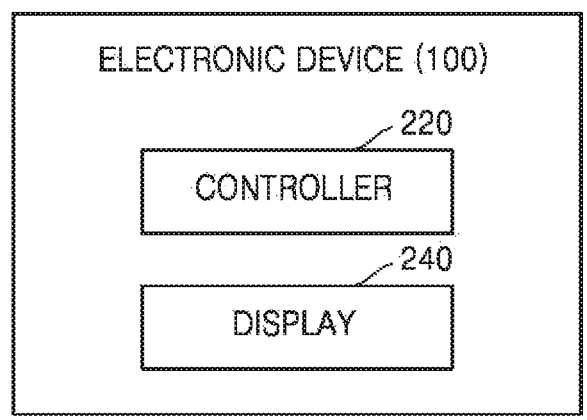
FIGS. 2A and 2B illustrate various units of an electronic device as illustrated in FIGS. 1A, 2B, and 1C, according to various embodiments of the present disclosure.

FIG. 2A is a block diagram illustrating an electronic device 100 according to an embodiment of the present disclosure.

Referring to FIG. 2A, the electronic device 100 may include a controller 220 (including, for example, hardware circuitry configured for control and a display (including, liquid crystal display (LCD), organic light-emitting diode (OLED), etc.).

The controller 220 may identify at least one secondary applications based on at least one of an application executed on the electronic device and content included in the application.

The display 240 may display at least one representation corresponding to the at least one secondary application on the electronic device 100.

In an embodiment, the controller 220 is configured to dynamically position the at least one representation within a display area of a screen of the electronic device 100.

In an embodiment, the controller 220 is configured to select one of the at least one representation based on an input and invoke one of the at least one secondary application corresponding to the selected representation on the electronic device 100.

In an embodiment, the controller may automatically provide the content included in the application to the secondary application. The controller may perform an action via the selected secondary application; and invoke a supplemental application for the secondary application when the action is completed.

In an embodiment, the controller may receive, via the secondary application, an input selecting at least one file, send the at least one file to another electronic device via the secondary application; and dynamically associate the at least one file with the application executed on the electronic device 100.

In an embodiment, the controller may select a content in the selected secondary application, dynamically associate the selected content with a portion of the application, receive an input in a selected content associated with the portion of the application; and render the selected content on the screen of the electronic device.

In an embodiment, the controller may automatically identify a content in the secondary application; and dynamically associate the identified content with a portion of the application.

In an embodiment, the controller may determine whether an application is related to the content included in the application.

Figure 2B:
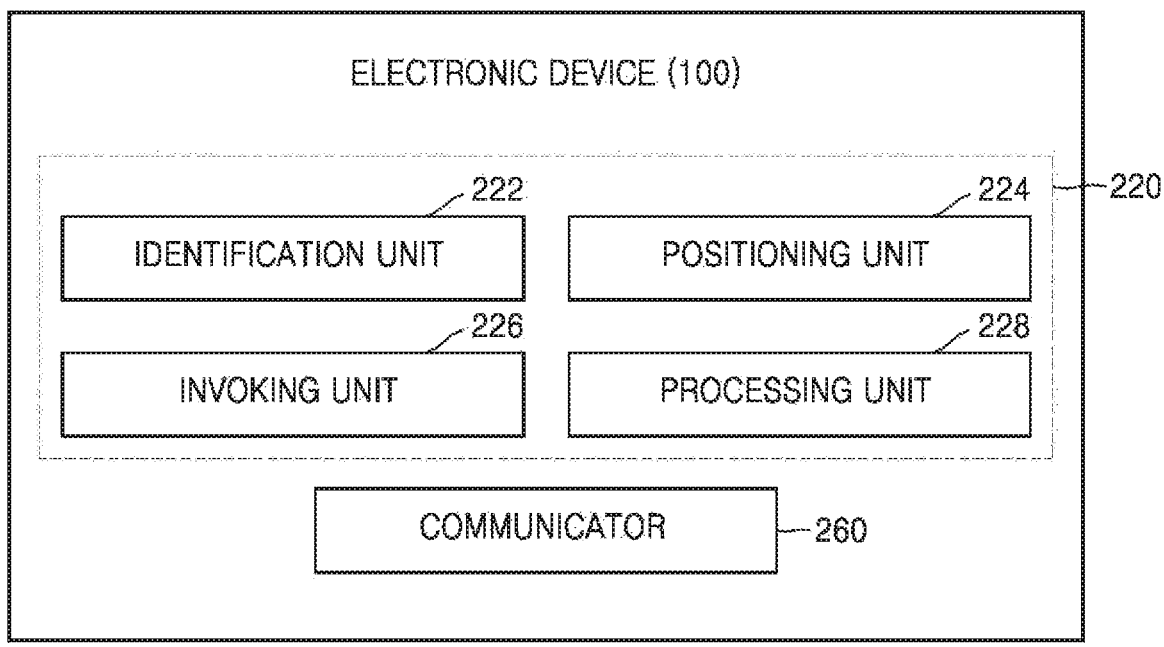

FIG. 2B illustrates various units of an electronic device 100 according to an embodiment of the present disclosure. The electronic device 100 may include the controller 220 and communicator 260 (including, for example, hardware circuitry configured for communication, e.g. communication interface). The controller 220 may include an identification unit 222, a positioning unit 224, an invoking unit 226, a processing unit 228.

Referring to FIG. 2B, the identification unit 222 may identify one or more secondary applications based on at least one of the application executed (e.g., displayed) on the electronic device 100 and/or the content included in the application.

After identifying one or more secondary applications, the positioning unit 224 may dynamically position at least one representation of the one or more secondary applications on the screen 102.

In an embodiment, based on the positions of the one or more representations on the screen 102 of the electronic device 100, the invoking unit 226 may invoke one of the secondary applications on the screen 102 by receiving a user input, e.g., touch input on the screen 102, selecting a representation corresponding one of the secondary application. In an embodiment, based the positions of the one or more representations of the secondary application on the screen 102 of the electronic device 100, the invoking unit 226 may automatically invoke the secondary application on the screen 102.

In an embodiment, after invoking the secondary application on the screen, the processing unit 228 may automatically input content of the displayed application to the secondary application. After automatically inputting the content of the displayed application to the secondary application, the processing unit 228 may perform an action via the secondary application. After the action is completed via the secondary application, the electronic device 100 may provide a prompt or notification (not illustrated) to the user via the communicator 260 for the user to choose whether to continue using the secondary application, return to the initially displayed application, or use a supplemental application which is different from the secondary application. In an embodiment, the electronic device 100 may automatically return the user to the initially displayed application or invoke a supplemental application after the electronic device 100 completes the action via the secondary application.

Although FIG. 2B illustrates the identification unit 222, the positioning unit 224, the invoking unit 226, the processing unit 228, and the communicator 240 as being included in the electronic device 100, the electronic device 100 is not limited thereto. The electronic device 100 may include fewer components, different components, differently arranged components, or additional components compared to those illustrated in FIG. 2B. For example, the functions of the identification unit 222, the positioning unit 224, the invoking unit 226, and the processing unit 228 may be performed by a one function unit, i.e., a controller 220. Additionally or alternatively, one or more components of the electronic device 100 may perform functions described herein.

Figure 3:
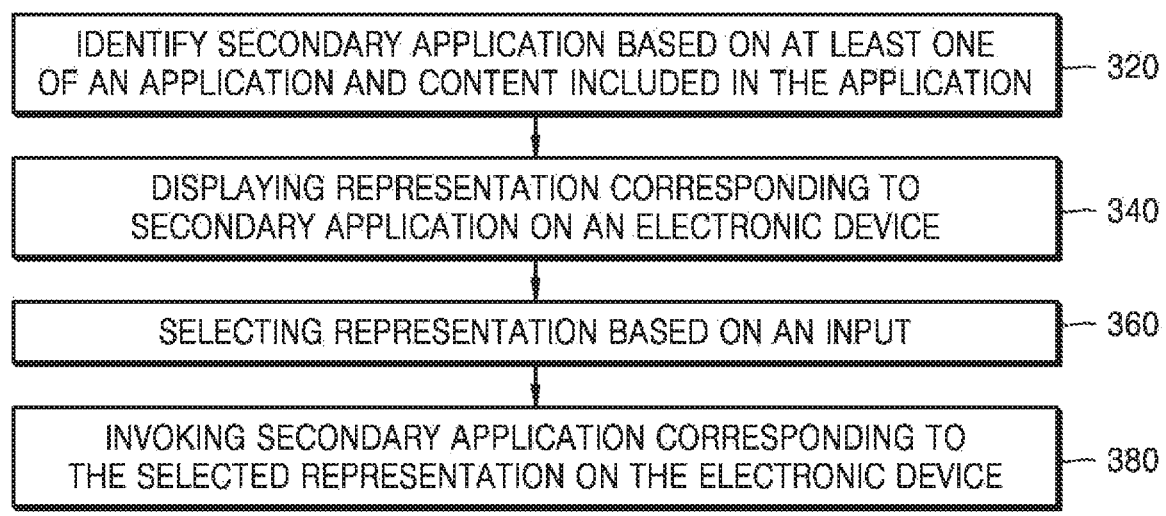
FIG. 3 is a flow diagram illustrating a method of managing applications on an electronic device according to an embodiment of the present disclosure.

FIG. 3 is a flow diagram illustrating a method for managing applications on an electronic device, according to various embodiments of the present disclosure.

Referring to FIG. 3, at operation 320, the electronic device 100 may identify, by a processor, at least one secondary application based on at least one of an application executed on the electronic device and content included in the application.

In an embodiment, the electronic device 100 determines whether an application is related to the content included in the application executed (e.g., displayed) on the electronic device. In an embodiment, the electronic device 100 may identify one or more secondary applications related to an application displayed on the screen 102 of the electronic device 100 and/or content of the application.

In an embodiment, the electronic device may identify one or more secondary applications in the electronic device 100 which are either installed by the user or pre-installed. In an embodiment, secondary applications may be obtained from an external device, e.g. cloud server via a network.

In an embodiment, if the electronic device 100 does not identify a secondary application, the electronic device 100 may invoke a default browser or prompt the user to download a secondary application from an external device, e.g., cloud server via a network.

At operation 340, the electronic device 100 may display at least one representation corresponding to the at least one secondary application on the electronic device.

In an embodiment, the at least one representation is displayed within a portion of a screen of the electronic device, e.g., ICP. In an embodiment, the electronic device 100 may include dynamically positioning the representation of the secondary application. In an embodiment, the electronic device 100 may dynamically position the representation of the secondary application. In an example, the electronic device 100 may position all secondary applications within a display area (including ICP).

At operation 360, the electronic device 100 may select one of the at least one representation based on an input. In an embodiment, the electronic device 100 may select one of the at least one representation based on a touch input or hovering on the at least one representation.

At operation 380 electronic device 100 may invoke one of the at least one secondary application corresponding to the selected representation on the electronic device.

In an embodiment, the electronic device 100 may invoke the secondary application on the screen 102. For example, based on the input received from the user, the electronic device 100 opens the secondary application in a portion of the screen 102 of the electronic device 100 on which the displayed application is currently displayed. Also, the content in the secondary application is resized to fit in the display area of the screen of the electronic device 100.

In an embodiment, the electronic device 100 may automatically provide the content included in the application to the selected secondary application. The electronic device 100 may perform an action via the selected secondary application and invoke a supplemental application for the secondary application when the action is completed.

In an embodiment, the electronic device 100 may represent the one of the at least one secondary application and the at least one of application on a multi window on a screen of the electronic device.

In an embodiment, the electronic device 100 may select a content in the selected secondary application, dynamically associate the selected content with a portion of the application, receive an input in a selected content associated with the portion of the application, and render the selected content on the screen of the electronic device 100.

In an embodiment, the electronic device 100 may automatically identify a content in the secondary application and dynamically associating the identified content with a portion of the application.

The various actions, acts, blocks, steps, and the like described in FIG. 3 may be performed in the order presented, in a different order, or simultaneously. Further, in some embodiments, some actions, acts, blocks, steps, and the like may be omitted, added, modified, skipped, or the like without departing from the scope of the present disclosure.

Figure 4A:
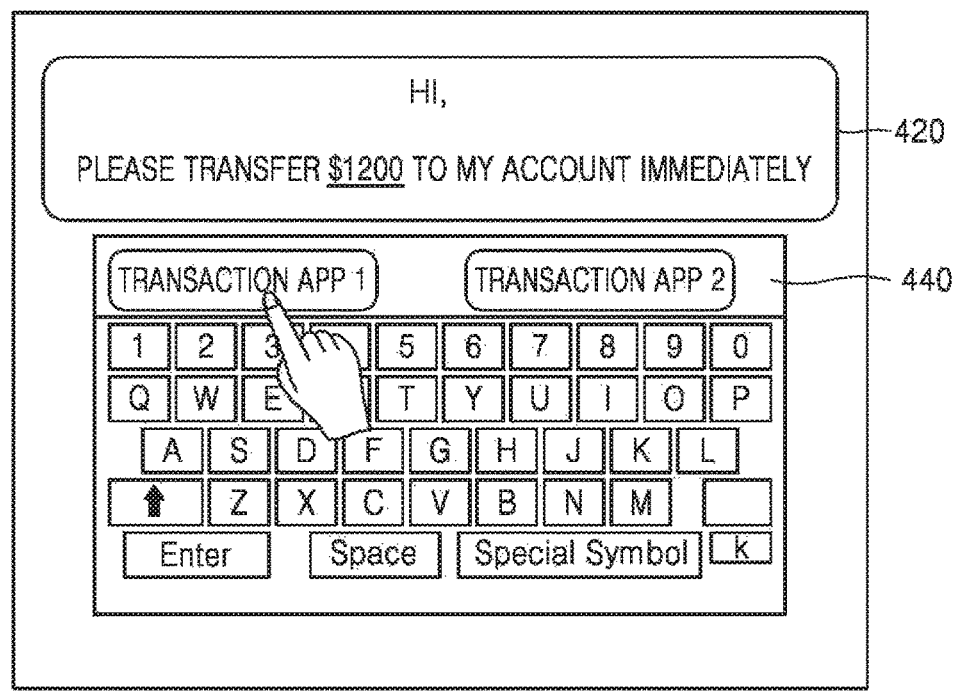
FIGS. 4A and 4B illustrate an embodiment in which a bank transaction application is identified based on an application displayed on a screen of the electronic device and/or content in the displayed application.
Figure 4A:
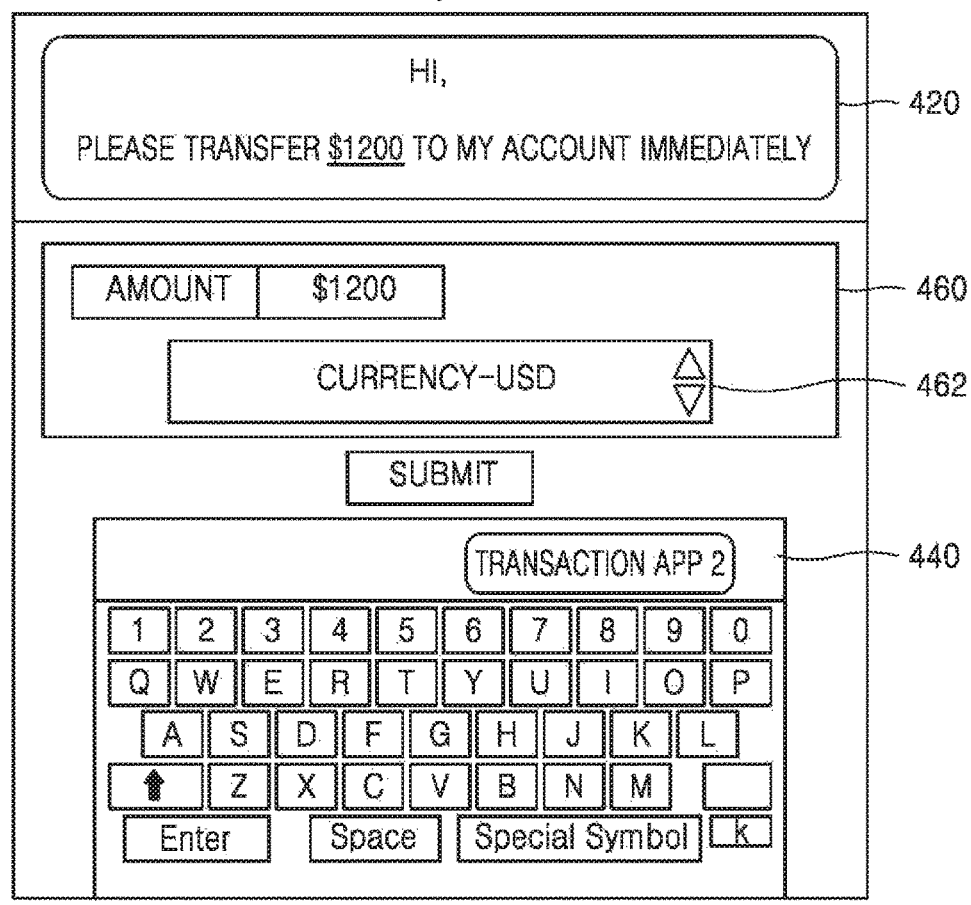
Figure 4B:
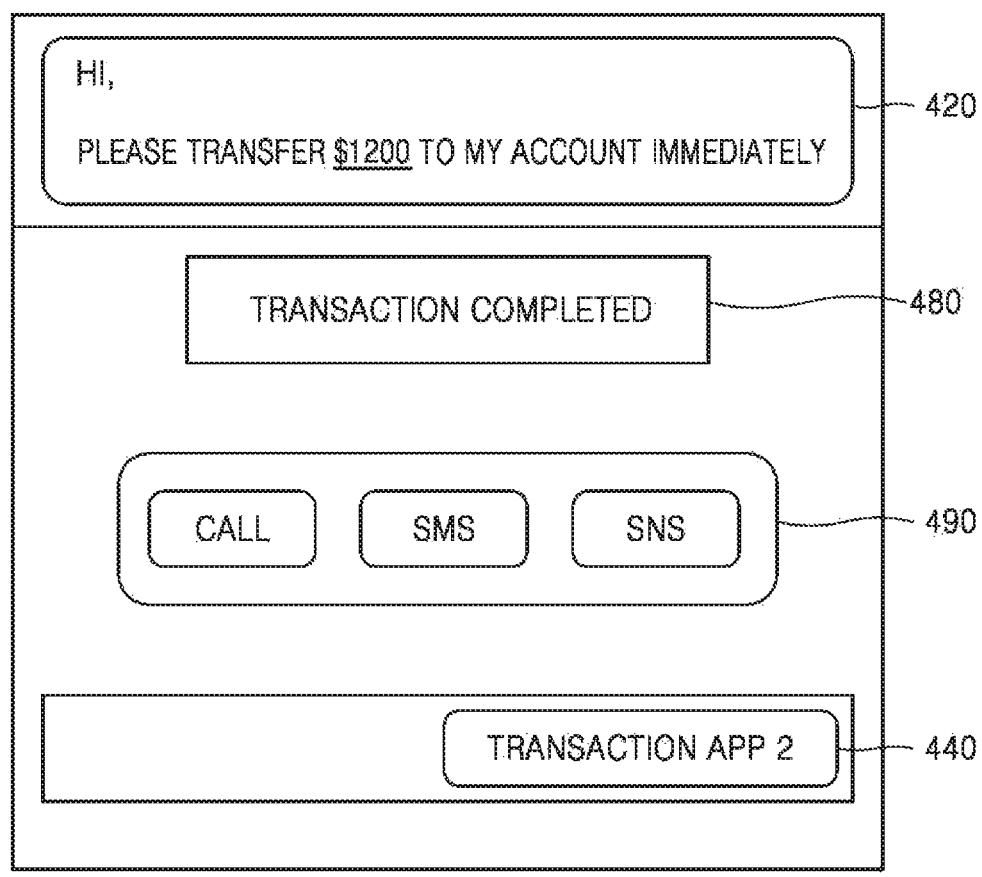

FIGS. 4A and 4B illustrate an embodiment in which a bank transaction application is identified based on an application (e.g., instant messaging application, an email application) displayed on a display area 420 of the screen 102 of the electronic device 100 and/or content (e.g., text) in the displayed application. In an embodiment, a user of the electronic device 100 is communicating with another user of the other electronic device (not shown) via an instant messaging application according to an embodiment of the present disclosure.

Referring to FIGS. 4A and 4B, the communication may be voice, video or text-based communication. The communication illustrated in FIG. 4A is related to the transfer of money from a bank account. Based on text messages being exchanged via an instant messaging application on an electronic device 100, the electronic device 100 determines that the user may require an application related to the transfer of money, and identifies at least one secondary applications related to a bank transaction in the electronic device 100 which are either installed by the user or pre-installed by a manufacture, e.g., original equipment manufacturer (OEM).

In an embodiment, the electronic device 100 identifies bank transaction related applications as secondary applications since the communication was related to the transfer of money from a bank account. After identifying bank transaction applications, the electronic device 100 may dynamically position the icons of the bank transaction applications in the display area 440 of the ICP of the screen 102. In an embodiment, the electronic device 100 may select a bank transaction application based on a touch input (e.g., by a user) on an icon corresponding to the bank transaction application in the display area 440 of the ICP and invoke the selected bank transaction application.

In an embodiment, the electronic device 100 may auto-input the content, i.e., the transfer amount and currency type which have been communicated between users during the communication, to the selected bank transaction application. In an embodiment, if the user desires to change the currency before confirming the money transfer, the user may change the currency using arrows (not shown) or a scroll bar 462 as illustrated in a display area 460 and select the desired currency before initiating the money transfer. In an embodiment, the electronic device 100 may change the currency based on an input.

Once the user selects submit, the transaction will be completed. In an embodiment, the electronic device displays a message, e.g., transaction completed, in a display area 480 of the screen 102.

In an embodiment, once the bank transaction is completed, the electronic device 100 may invoke one or more supplemental applications illustrated in a display area 490 (e.g. short message service (SMS) application, voice call application, SNS application, an email application) to inform the other user of the completed transaction.

Figure 5:
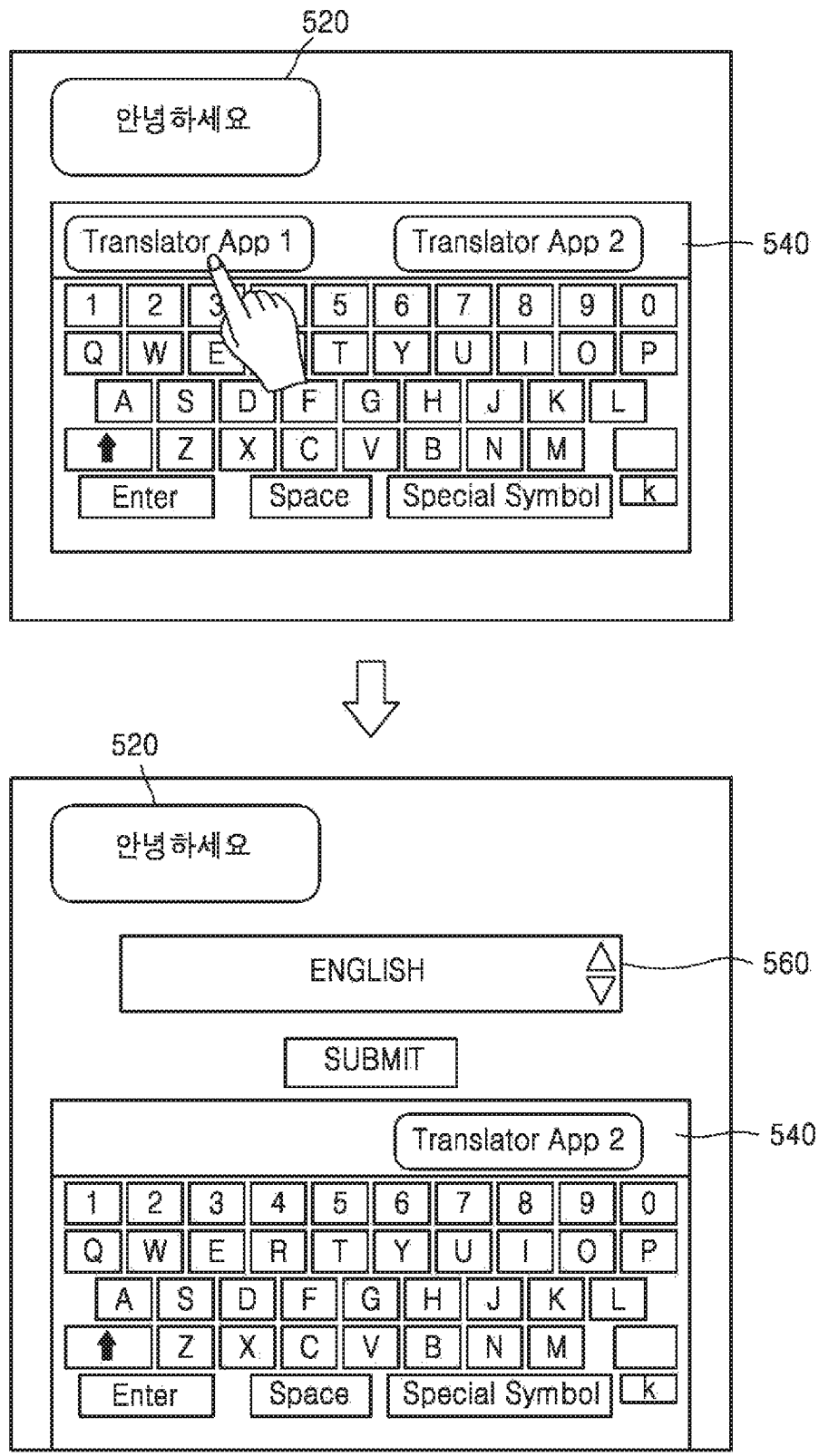
FIG. 5 illustrates an embodiment in which a translation application is identified based on an application displayed on a screen of the electronic device and/or content in the displayed application.

FIG. 5 illustrates an embodiment in which translation applications are identified based on an application (e.g., instant messaging application, an email application) displayed on a display area 520 on the screen 102 of the electronic device 100 and/or content (e.g., text) in the displayed application according to an embodiment of the present disclosure. In an embodiment, the user of the electronic device 100 is communicating with another user via an instant messaging application.

In an example, the communication may be voice communication, video communication, text-based communication, or the like. The content in the communication illustrated in FIG. 5 is in a language different from the set language of the electronic device 100 of the user. Based on text messages being exchanged between users, the electronic device 100 determines that the user may require an application related to translation, and the electronic device 100 identifies secondary applications in the electronic device 100 which are either installed by the user or pre-installed. The electronic device 100 identifies translation applications since the communication was related to content translation. After identifying the translation applications, the electronic device 100 may dynamically position the icons of the translation applications in the display area 540 of the ICP of the screen 102. Further, the user selects the desired translation applications for content translation.

In an embodiment, the electronic device 100 may select a translation application based on a touch input on the display area 540 and invoke the selected translation application for content translation. In an embodiment, the electronic device 100 can auto-feed the content which has been communicated between users during the communication, to the selected translation application. In an embodiment, if the user desires to change the language before confirming a translation service, the user may change the language using arrows (not shown) or a scroll bar 560 and select the desired language before initiating the translation service. In an embodiment, the electronic device 100 select a language based on an input selecting a language.

Once the user selects submit, the translation service will be completed. In an embodiment, the electronic device 100 may invoke the translation service based on a touch input on a display area 540.

Figure 6A:
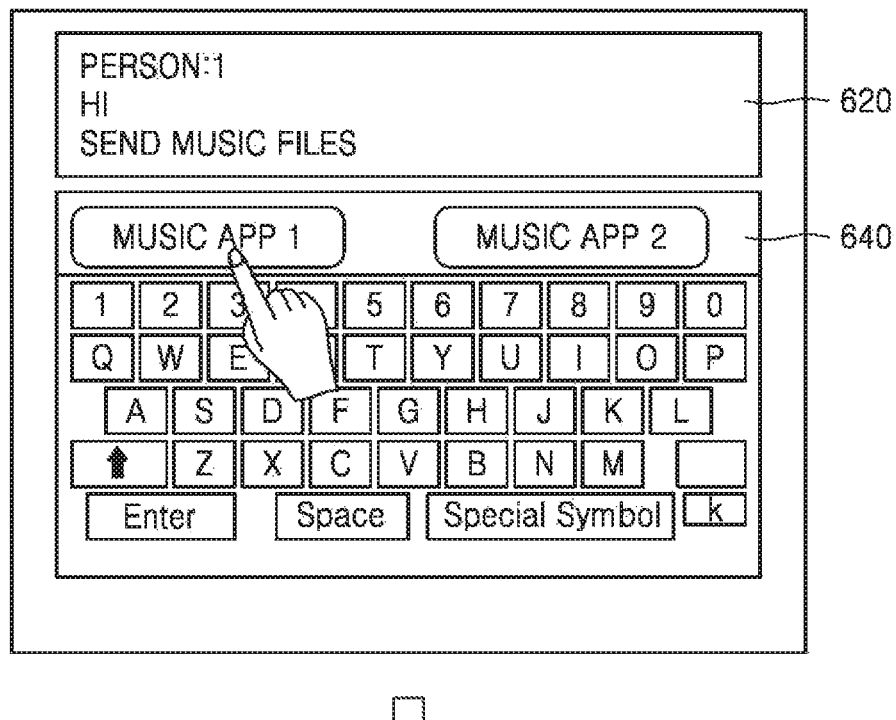
FIGS. 6A and 6B illustrate an embodiment in which music applications are identified based on an application displayed on a screen of the electronic device and/or content in the displayed application.
Figure 6A:
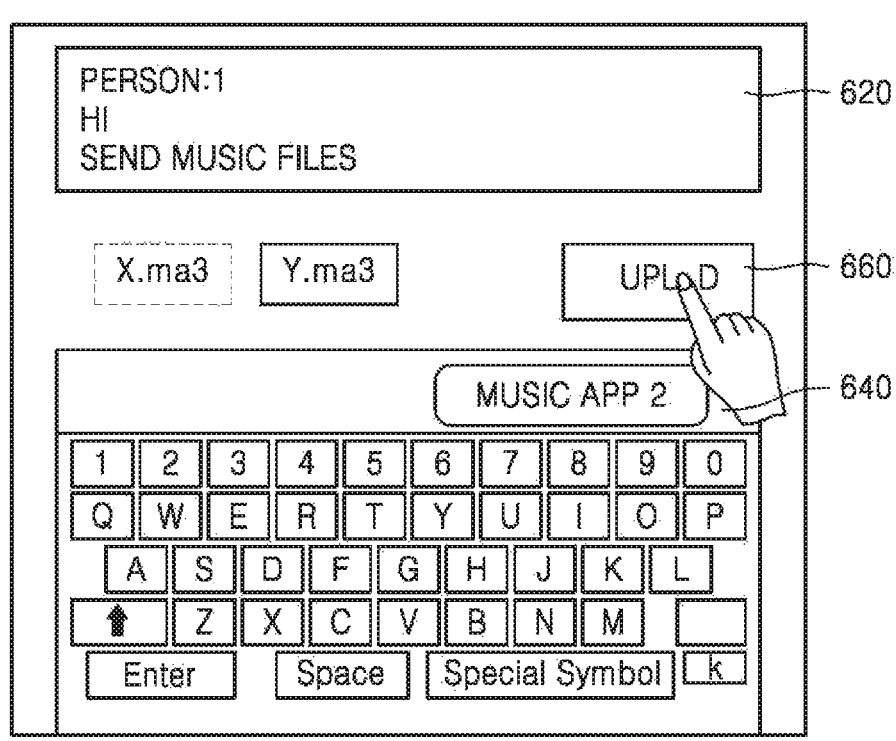
Figure 6B:
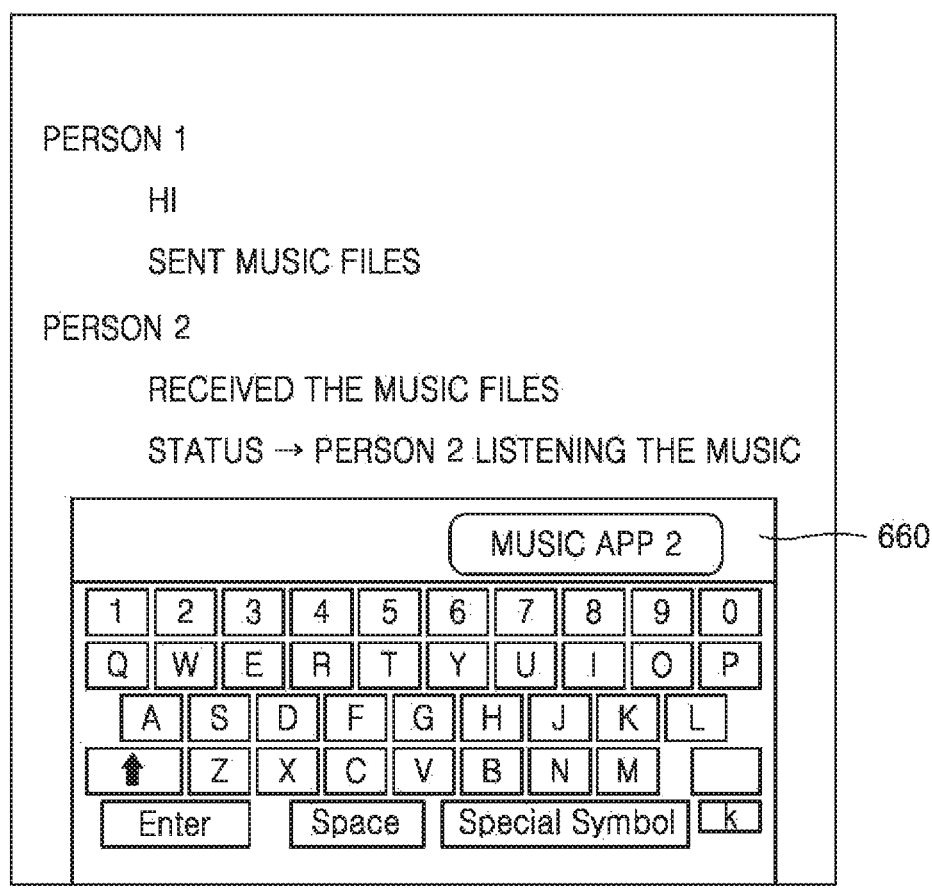

FIGS. 6A and 6B illustrate an embodiment in which music applications are identified based on an application (e.g., instant messaging application, an email application) displayed in a display area 620 on the screen 102 of the electronic device 100 and/or content (e.g., text) in the displayed application. In an embodiment, the user of the electronic device 100 is communicating with another user via an instant messaging application. The communication may be voice communication, video communication, text-based communication, or the like.

Referring to FIGS. 6A and 6B, the communication illustrated in FIG. 6A is related to a music service. Based on text messages being exchanged between users, the electronic device 100 determines that the user may require a music application related to playing an audio file. In an embodiment, the electronic device 100 identifies secondary applications in the electronic device 100 which are either installed by the user or pre-installed. The electronic device 100 identifies music applications since the communication was related to audio content such as music files. After identifying the music applications, the electronic device 100 may dynamically position the icons of the music applications in the display area 640 of the ICP of the screen 102. Further, the user selects the desired music applications for the music service. In an embodiment, the electronic device may select the desired music application based on a touch input on one of the icons displayed within the display area 640 (e.g., ICP).

In an embodiment, the electronic device may upload the audio content to the desired music applications based on a touch input on a display area 660. Once the other user (i.e., receiver) receives the uploaded audio content, the user (i.e., sender) may view the status of uploaded audio content as illustrated in FIG. 6B. In another embodiment, rather than sending the audio file directly to the electronic device of the other user (i.e., receiver), the electronic device 100 (i.e., sender) may upload the audio file to cloud storage and send a link via which the electronic device of the other user may access the audio file. In another embodiment, the audio file may already be uploaded to cloud storage, and the electronic device 100 (i.e. sender) may send a link via which the electronic device of the other user may access the audio file.

Figure 7:
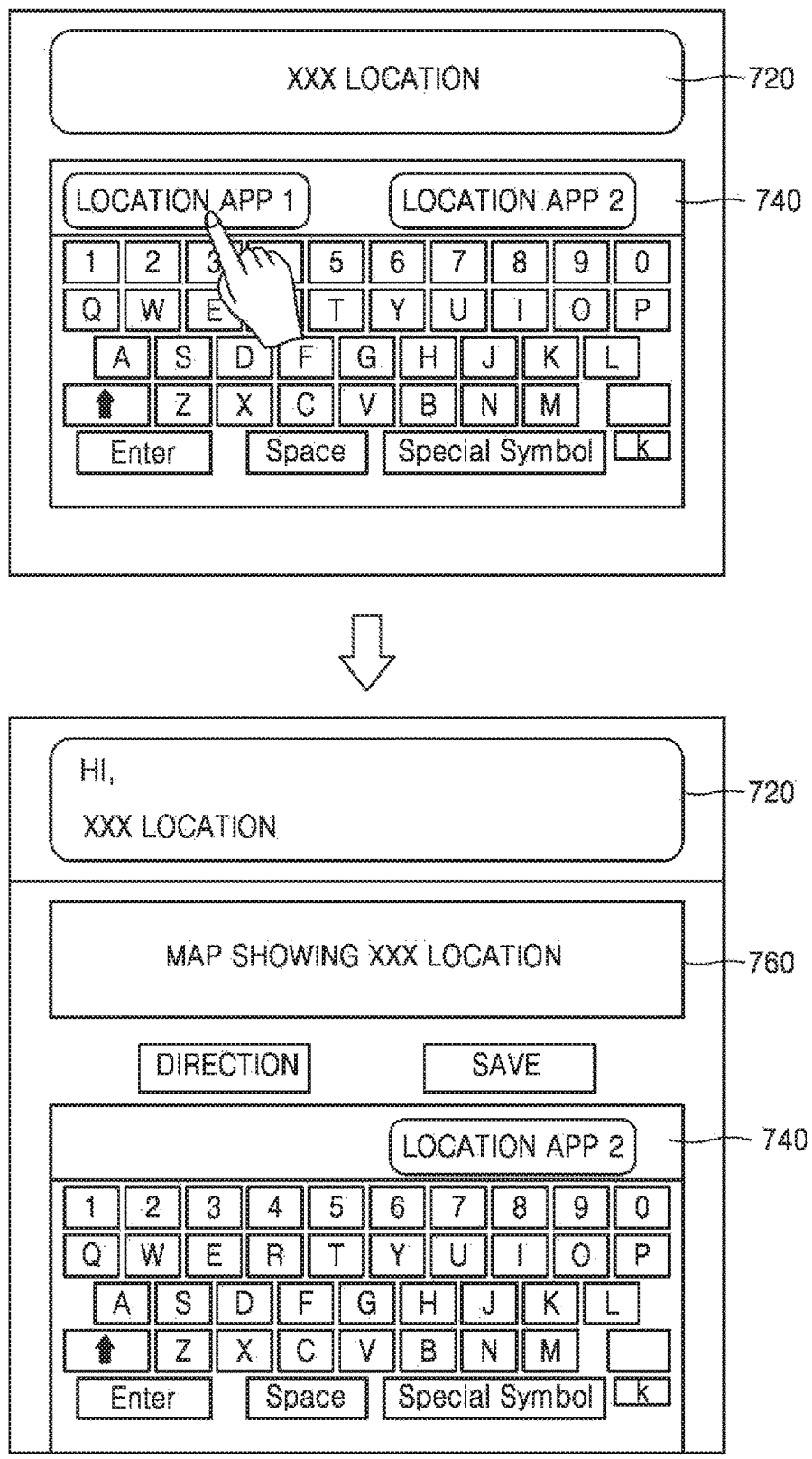
FIG. 7 illustrates an embodiment in which location applications are identified based on an application displayed on a screen of the electronic device and/or content in the displayed application.

FIG. 7 illustrates an embodiment in which location applications are identified based on an application (e.g., instant messaging application, an email application) displayed in a display area 720 on the screen 102 of the electronic device 100 and/or content (e.g., text, GPS coordinates, etc.) in the displayed application according to an embodiment of the present disclosure. In an embodiment, the user of the electronic device 100 is communicating with another user via an instant messaging application. The communication may be voice communication, video communication, text-based communication, or the like. The communication illustrated in FIG. 7 is related to a location.

Referring to FIG. 7, based on text messages being exchanged between the users, the electronic device 100 determines that the user may require a location application related to displaying a location or providing directions to the location, for example a map application or a navigation application. The electronic device 100 identifies location applications or mapping applications as secondary applications since the communication was related to a location. In an embodiment, the electronic device 100 may identify secondary applications in the electronic device 100 which are either installed by the user or pre-installed. In an embodiment, the electronic device 100 may identify secondary applications in an external server connected with the electronic device 100 via a network.

After identifying the secondary applications, the electronic device 100 may dynamically position the icons of the secondary applications in the display area 740 of the ICP of the screen 102. In an embodiment, the electronic device 100 may select a secondary application based on a touch input on one of the icons displayed in the display area 740 and illustrate the map of the location in a display area 760 by activating the selected secondary application.

Figure 8A:
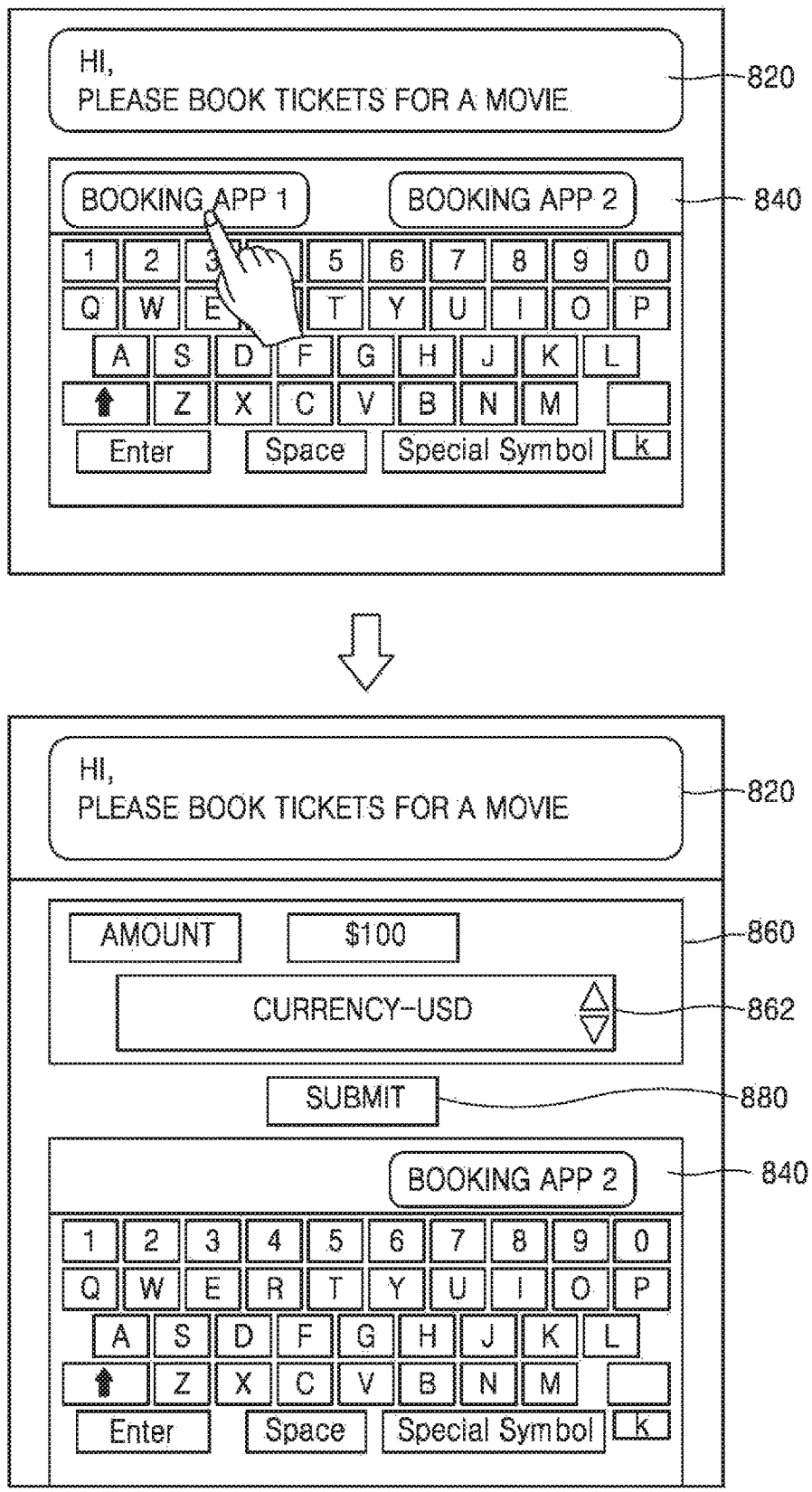
FIGS. 8A and 8B illustrate an embodiment in which ticket booking applications are identified based on an application displayed on a screen of the electronic device and/or content in the displayed application.
Figure 8B:
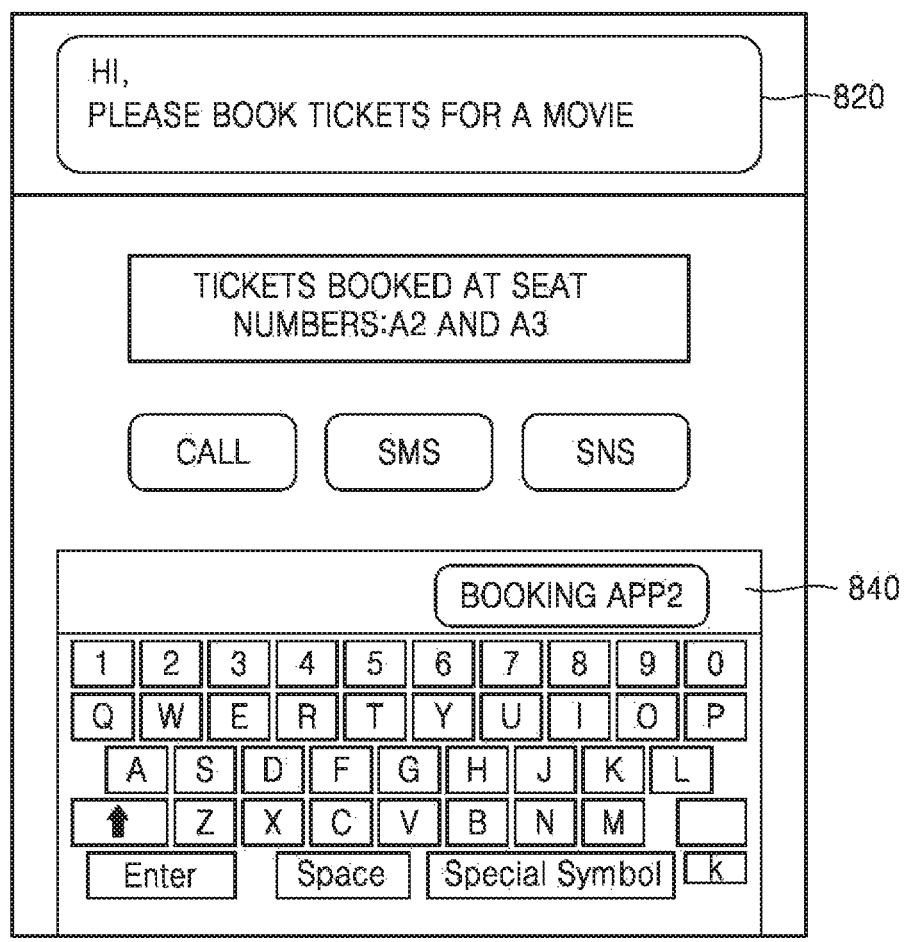

FIGS. 8A and 8B illustrate an embodiment in which ticketing applications are identified based on an application (e.g., instant messaging application, an email application) displayed in a display area 820 on the screen 102 of the electronic device 100 and/or content (e.g., text, an image of a movie poster, etc.) in the displayed application. In an embodiment, the user of the electronic device 100 is communicating with another user via an instant messaging application. The communication may be voice communication, video communication, text-based communication, or the like. The communication illustrated in FIG. 8A is related to purchasing a movie ticket. Based on text messages being exchanged between the users, the electronic device 100 determines that the user may require an application related to purchasing movie tickets. In an embodiment, the electronic device 100 identifies secondary applications in the electronic device 100 which are either installed by the user or pre-installed. The electronic device 100 identifies ticketing applications since the communication was related to purchasing movie tickets. After identifying the ticketing applications, the electronic device 100 may dynamically position the icons of the ticketing applications in the display area 840 of the ICP of the screen 102. Further, the user selects the desired applications. In an embodiment, the electronic device 100 may select a ticketing application based on a touch input on one of icons and illustrates the movie ticket related information by activating the selected ticketing application.

In an embodiment, if the user desires to change any information related to the movie tickets to be purchased, the user may change the information using arrows (not shown) or a scroll bar 862 and select the desired information before initiating the movie ticket purchase. In an embodiment, the electronic device 100 may change the information based on a touch input on a display area 860. In an embodiment, the electronic device 100 may select the submit operation based on a touch input on a display area 880 and complete the movie ticket purchase.

In an embodiment, once the movie ticket purchase is completed, the electronic device 100 may invoke one or more supplemental applications (e.g. SMS application, voice call application, SNS application) to inform the other user of the completed movie ticket purchase as illustrated in FIG. 8B.

Figure 9A:
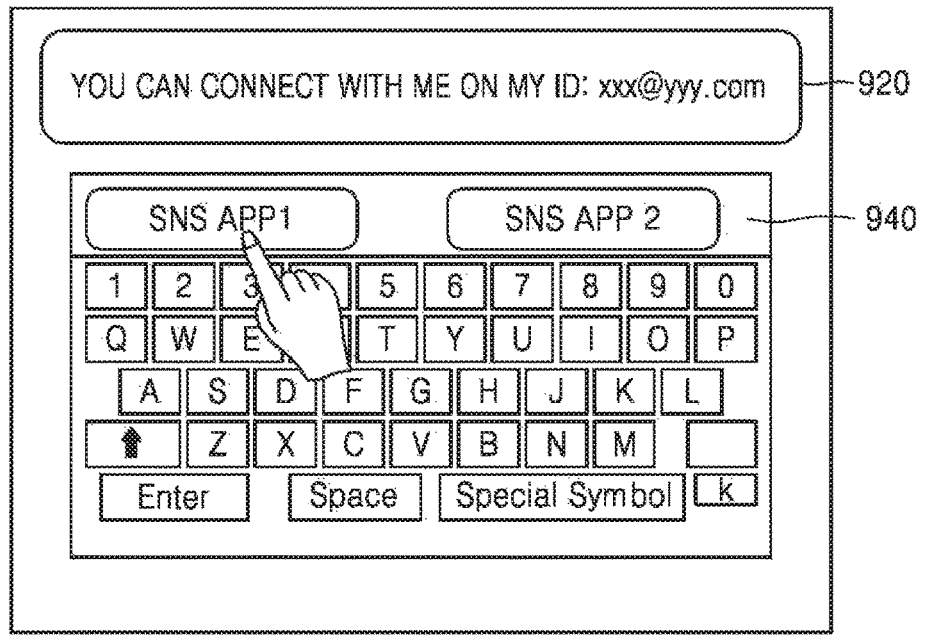
FIGS. 9A and 9B illustrate embodiments in which social networking site (SNS) applications are identified based on an application displayed on a screen of the electronic device and/or content in the displayed application.
Figure 9A:
Figure 9A:
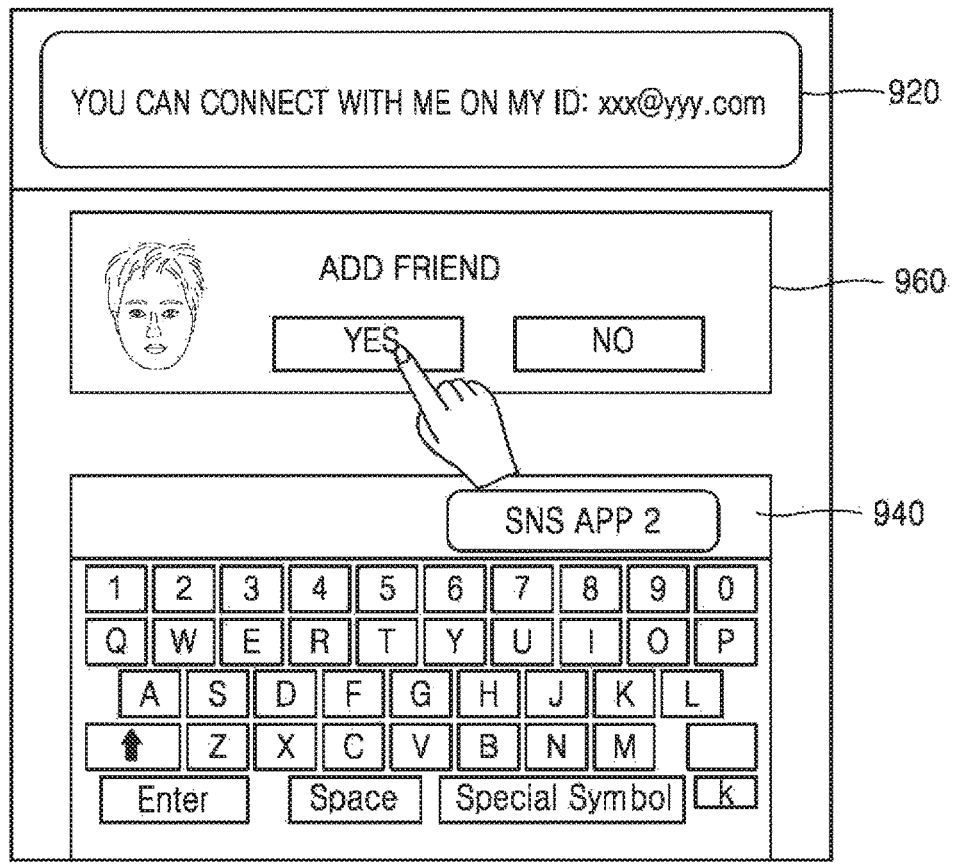
Figure 9B:
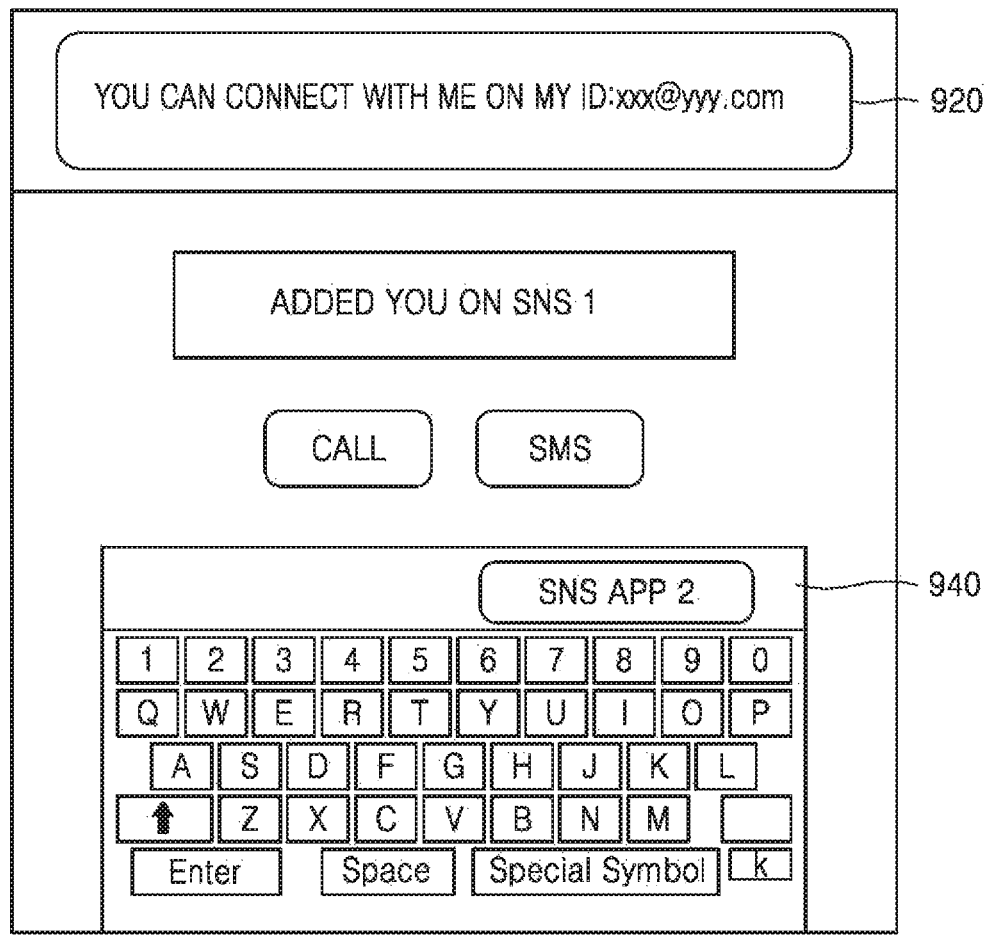
Figure 10:
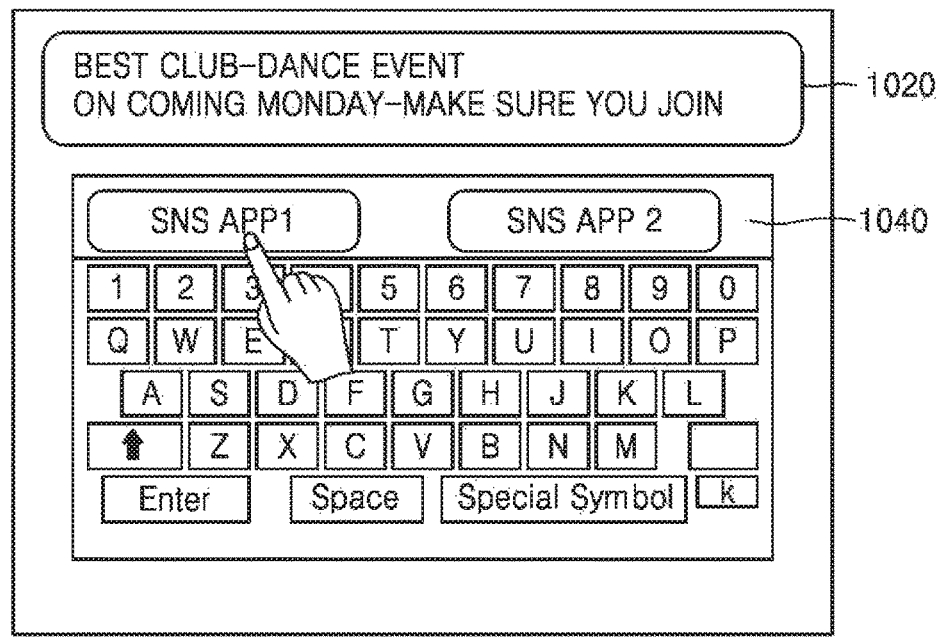
FIG. 10 illustrates embodiments in which SNS applications are identified based on an application displayed on a screen of a screen of the electronic device and/or content in the displayed application.
Figure 10:
Figure 10:
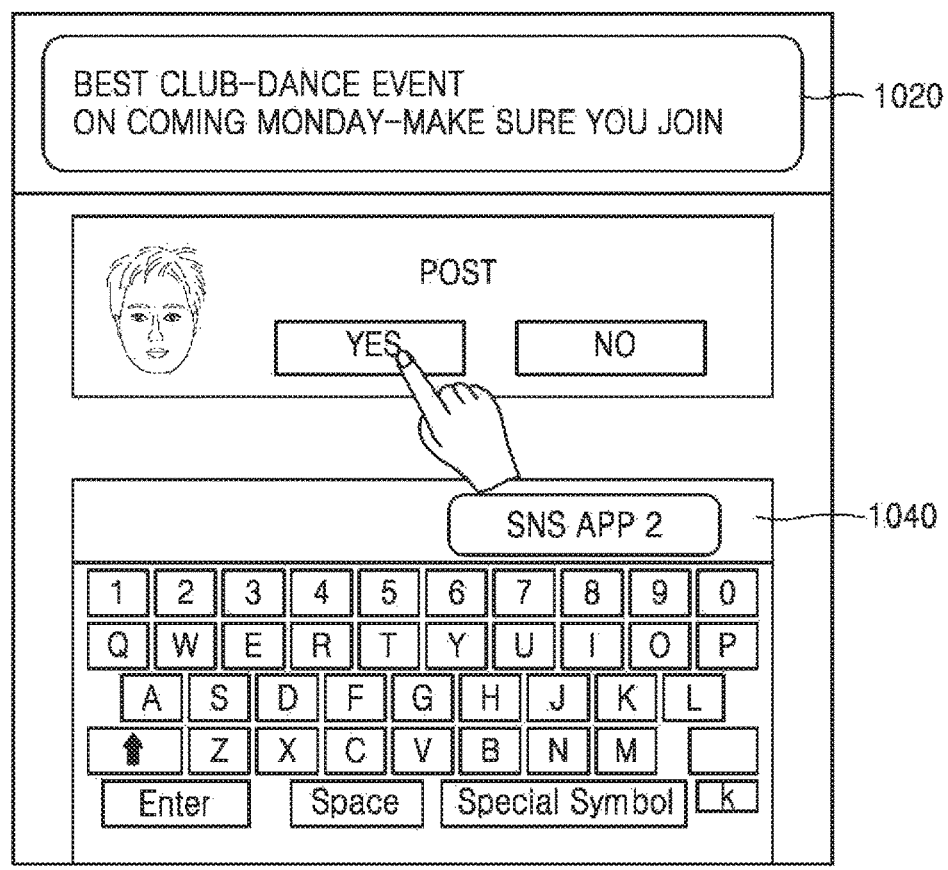

FIGS. 9A and 9B and FIG. 10 illustrate embodiments in which SNS applications are identified based on an application (e.g., instant messaging application, an email application) displayed in display area 920 on the screen 102 of the electronic device 100 and/or content (e.g., text, a scanned image of a business card, etc.) in the displayed application. As illustrated in FIG. 9A, the user of the electronic device 100 is communicating with another user via an instant messaging application. In an embodiment, the communication may be voice communication, video communication, text-based communication, or the like. The communication illustrated in FIG. 9A is related to adding a contact to the user's SNS contacts list (e.g., friends list). In an embodiment, based on text messages being exchanged between the users, the electronic device 100 determines that the user may require an application related to SNS applications. The electronic device 100 identifies secondary applications, i.e. related SNS applications in the electronic device 100 which are either installed by the user or pre-installed. The electronic device 100 identifies SNS applications since the communication was related to adding a contact (including, for example, e-mail address, phone number, etc.) to the user's SNS contacts list (e.g., friends list). After identifying the SNS applications, the electronic device 100 may dynamically position the icons of the SNS applications in the display area 940 of the ICP of the screen 102. Further, the user selects the desired SNS application to add the contact to the user's SNS contacts list (e.g., friends list) in the selected SNS application. In an embodiment, the electronic device may add the contact to the contact list stored on the electronic device 100 based on a touch input on a display area 960.

Referring to FIGS. 9A and 9B, after adding the contact as a friend to the user's SNS contacts list in the SNS application, the electronic device 100 may invoke a supplemental application (e.g. SMS application) illustrated in FIG. 9B to send a notification to the other user. In another embodiment, the user may add the contact to the user's phone contact list stored on the electronic device 100.

Referring to FIG. 10, the user of the electronic device 100 is communicating with another user via an instant messaging application displayed in a display area 1020. In an embodiment, the communication may be voice communication, video communication, text-based communication, or the like. The communication illustrated in FIG. 10 is related to posting content via the SNS application. Based on text messages being exchanged between the users, the electronic device 100 determines that the user may require an application related to posting content to a social networking site. In an embodiment, the electronic device 100 identifies relevant SNS applications in the electronic device 100 which are either installed by the user or pre-installed. The electronic device 100 identifies SNS applications since the communication was related to the posting the content to a social networking site.

After identifying the SNS applications, the electronic device 100 may dynamically position the icons of the SNS applications in the display area 1040 (e.g., ICP) of the screen 102. In an embodiment, the electronic device 100 may select a SNS application based on a touch input on one of the icons in the display area 1040 and post the content via the selected SNS application.

Figure 11:
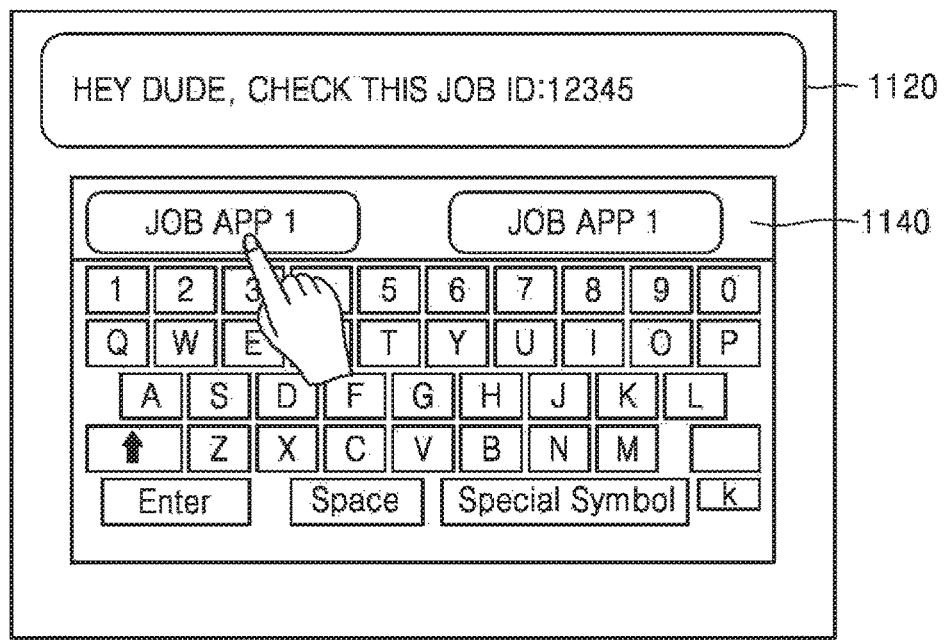
FIG. 11 illustrates an embodiment in which job search applications are identified based on an application displayed on a screen of the electronic device and/or content in the displayed application.
Figure 11:
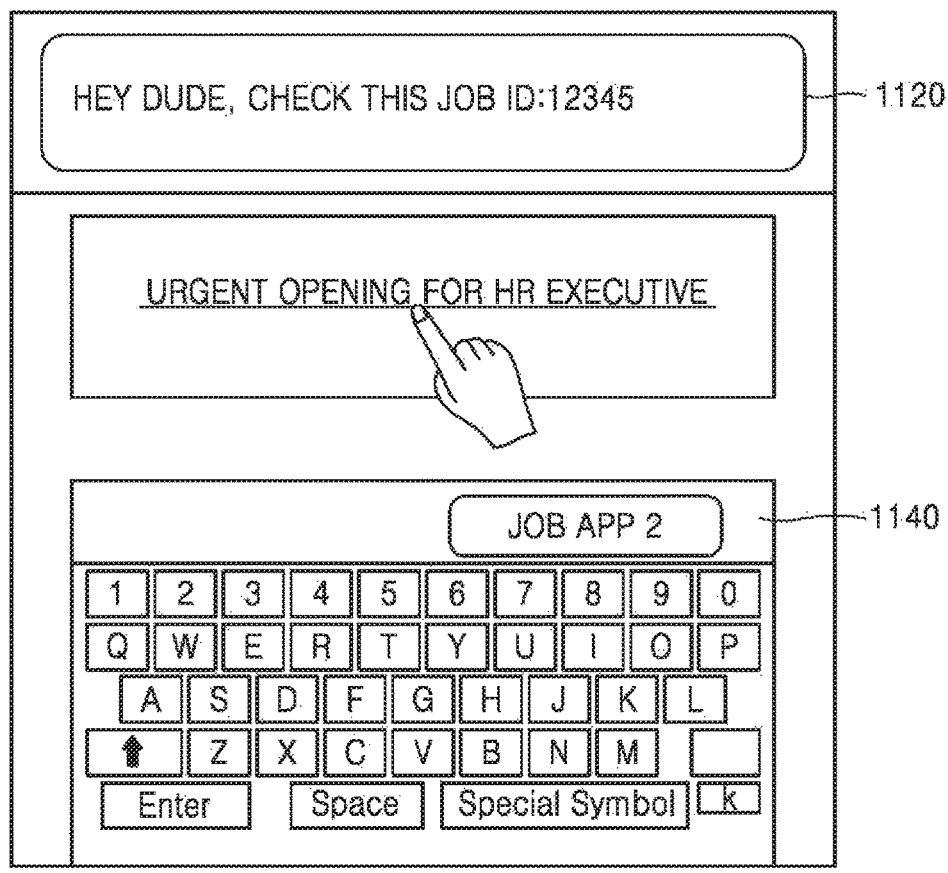

FIG. 11 illustrates an embodiment in which job search applications are identified based on an application (e.g., instant messaging application, an email application) displayed in a display area 1120 on the screen 102 of the electronic device 100 and/or content (e.g., text) in the displayed application according to an embodiment of the present disclosure. In an embodiment, the user of the electronic device 100 is communicating with another user via an instant messaging application. The communication may be voice communication, video communication, text-based communication, or the like. The communication illustrated in FIG. 11 is related to a job opening.

Referring to FIG. 11, based on text messages being exchanged between the users, the electronic device 100 identifies relevant job search applications in the electronic device 100 which are either installed by the user or pre-installed. The electronic device 100 identifies job search applications since the communication was related to a job opening. After identifying the job search applications, the electronic device 100 may dynamically position the icons of the job search applications in the display area 1140 (e.g., ICP) of the screen 102. In an embodiment, the electronic device 100 may select a job search application based on a touch input on one of the icons displayed in the display area 1140 and automatically invoke the selected job search application.

FIGS. 12 A and 12B illustrate an embodiment in which travel applications are identified based on an application (e.g., instant messaging application, an email application) displayed in a display area 1220 on the screen 102 of the electronic device 100 and/or content (e.g., text) in the displayed application according to an embodiment of the present disclosure. In an embodiment, the user of the electronic device 100 is communicating with another user via an instant messaging application. The communication may be voice communication, video communication, text-based communication, or the like. The communication illustrated in FIG. 12A is related to travel.

Figure 12A:
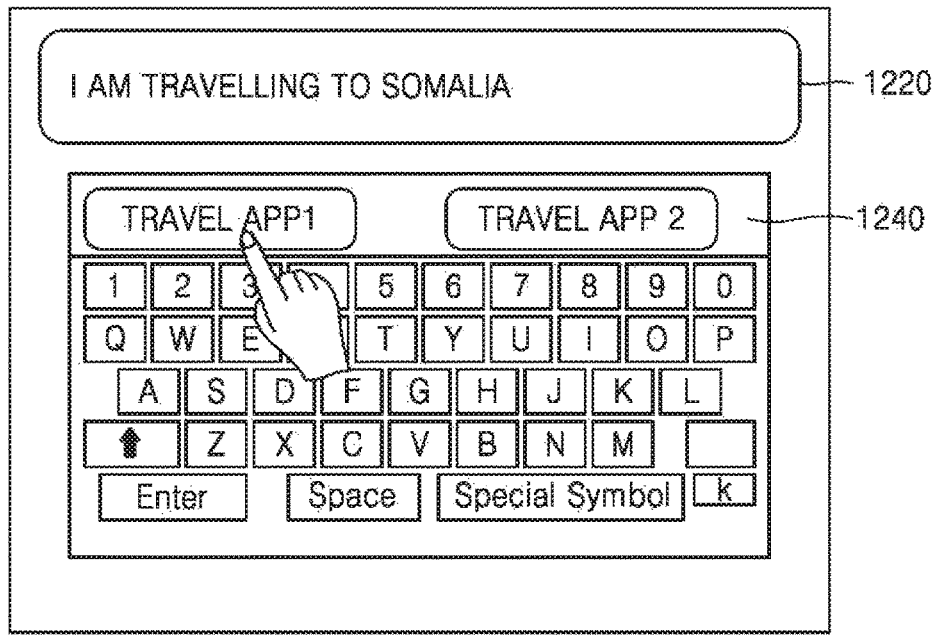
FIGS. 12A and 12B illustrate an embodiment in which travel applications are identified based on an application displayed on a screen of the electronic device and/or content in the displayed application.
Figure 12A:
Figure 12A:
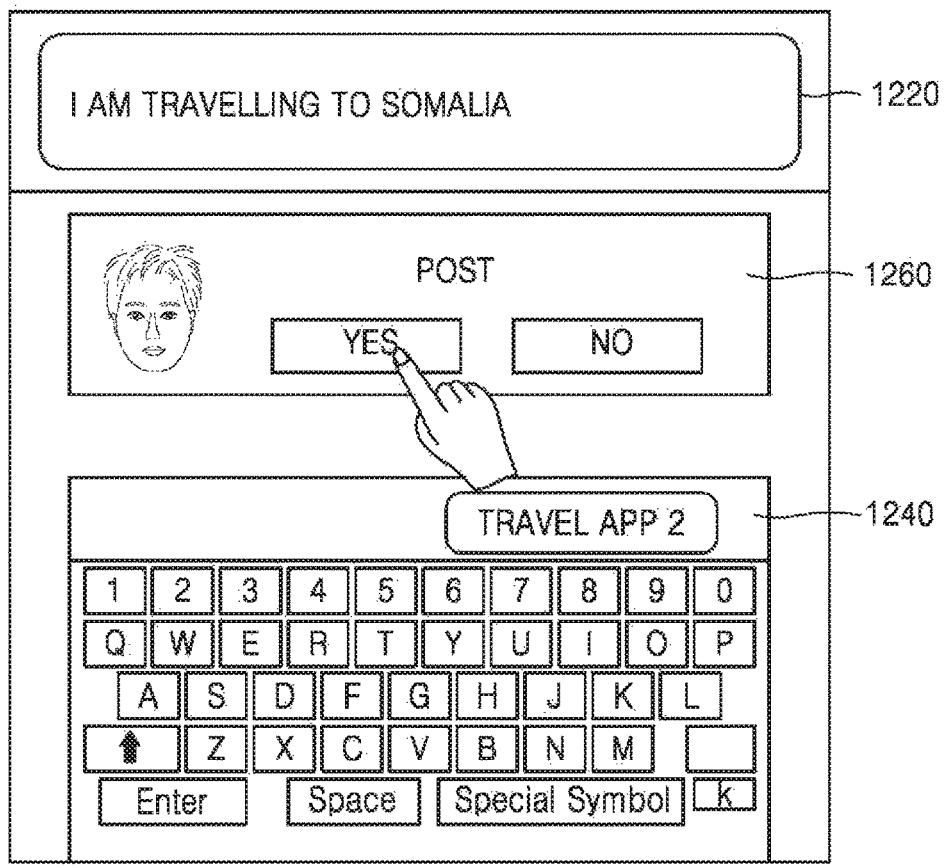
Figure 12B:
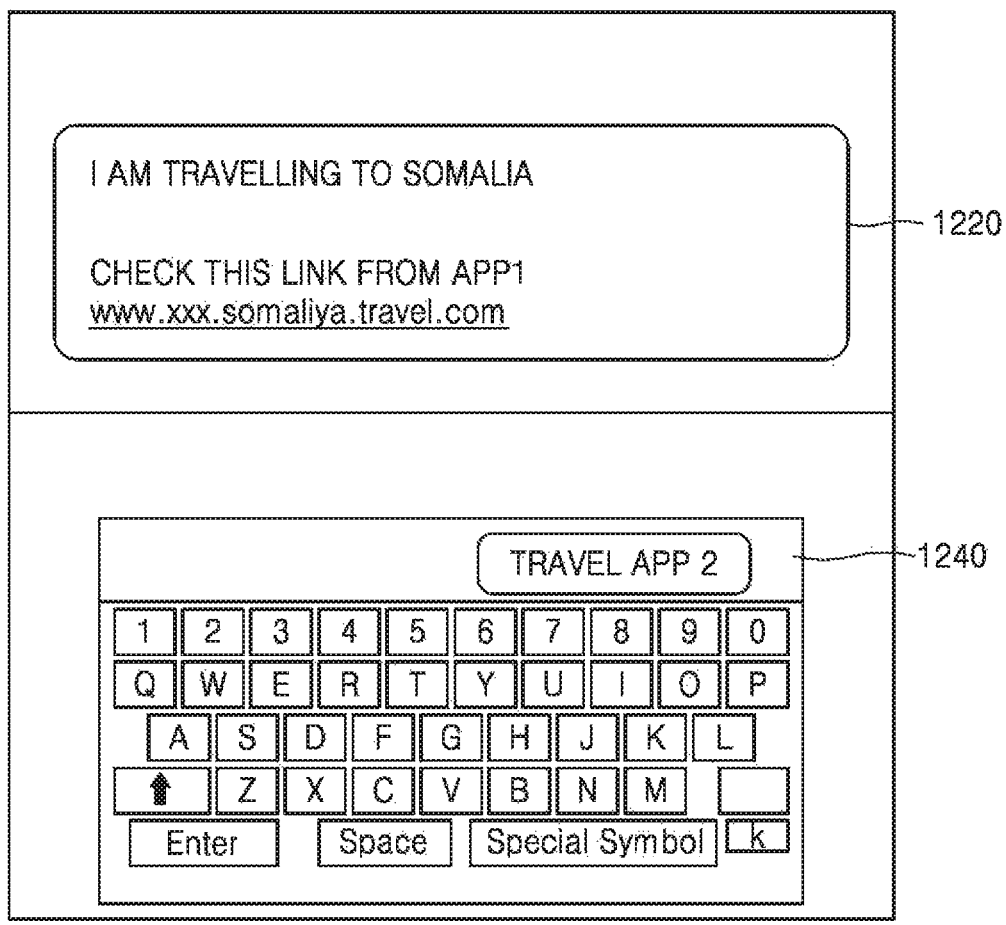

Referring to FIGS. 12A and 12B, based on text messages being exchanged between the users, the electronic device 100 may determine that the user may require an application related to travel, and the electronic device 100 identifies relevant travel applications in the electronic device 100 which are either installed by the user or pre-installed. The electronic device 100 identifies travel related applications as secondary applications since the communication was related to travel. After identifying the travel related applications, the electronic device 100 may dynamically position the icons of the travel related applications in the display area 1240 (e.g. ICP) of the screen 102. In an embodiment, the electronic device 100 may select a travel application based on an input, e.g., a touch input on one of the icons and invoke the selected travel application to share travel information (e.g., travel itineraries, tourist information, points of interest, etc.), to other users.

In an embodiment, the electronic device 100 may post user's travel information to the selected travel applications as displayed in a display area 1260. The user may view his travel information or related travel information via the selected travel application.

Figure 13A:
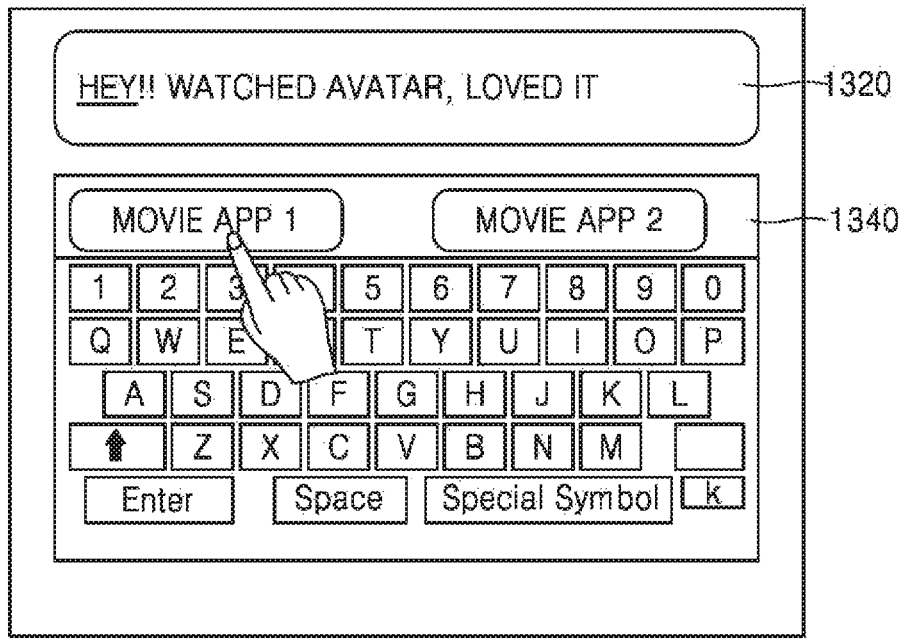
FIGS. 13A and 13B illustrate an embodiment in which video applications are identified based on an application displayed on a screen of the electronic device and/or content in the displayed application.
Figure 13A:
Figure 13A:
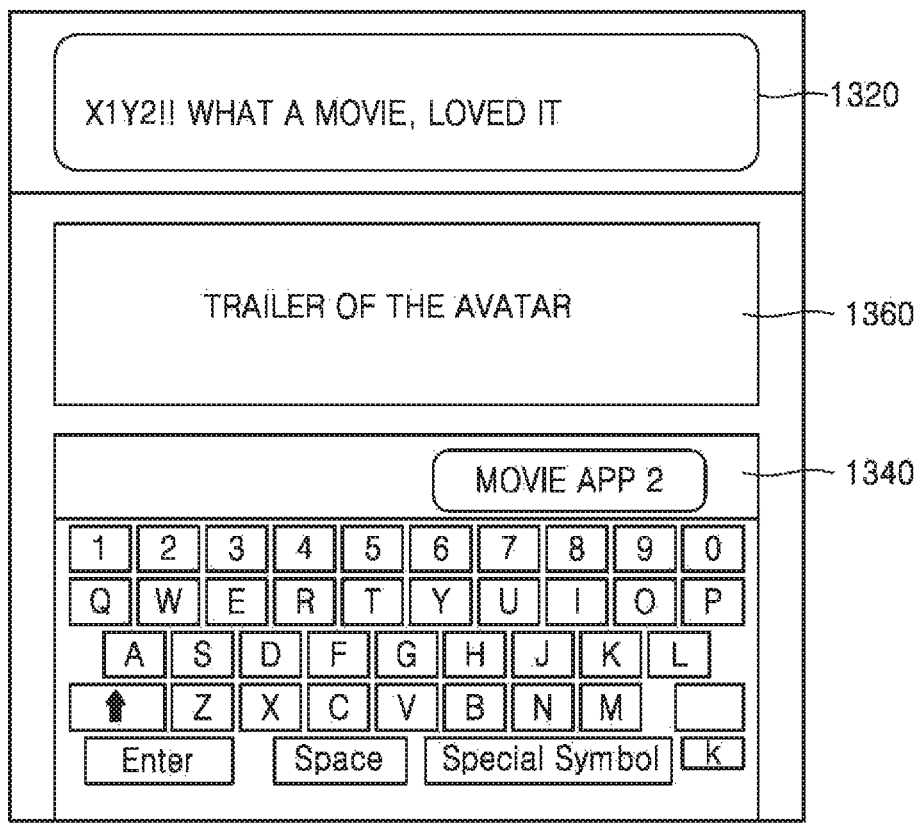
Figure 13B:
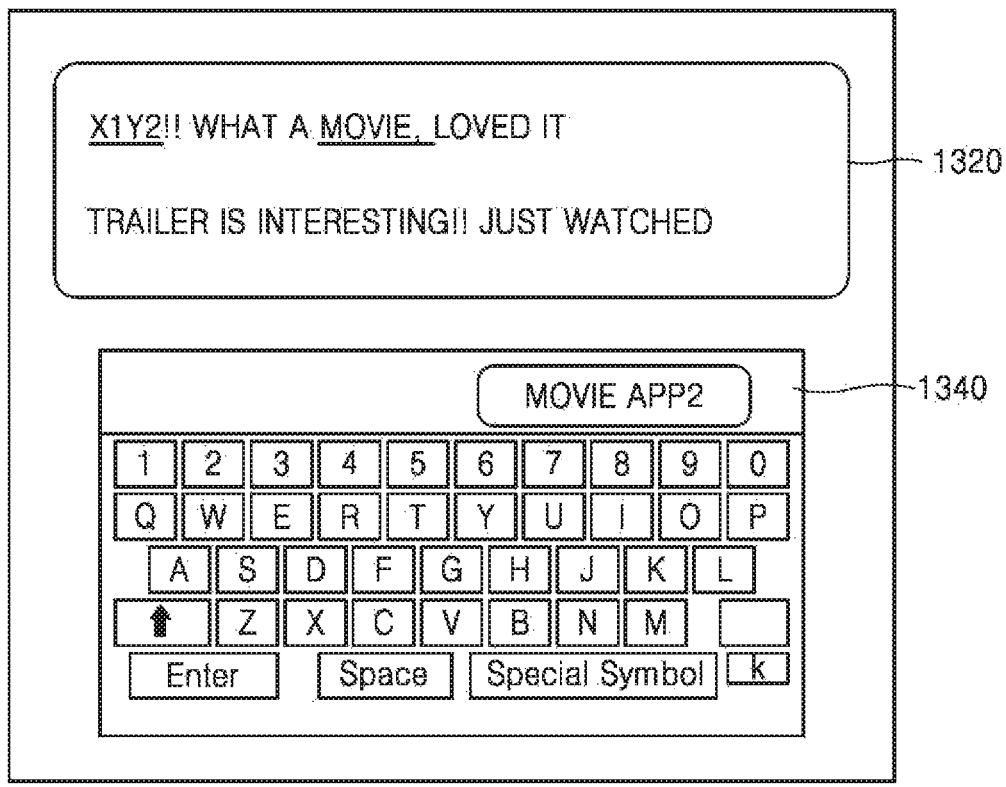

FIGS. 13A and 13B illustrate an embodiment in which video applications are identified based on an application (e.g., instant messaging application, an email application) displayed in a display area 1320 on the screen 102 of the electronic device 100 and/or content (e.g., text) in the displayed application. In an embodiment, the user of the electronic device 100 is communicating with another user via an instant messaging application. The communication may be voice communication, video communication, text-based communication, or the like. The communication may be related to a video. The video may be, for example, a movie, a television show, or user generated video content uploaded to a cloud server, but is not limited thereto. The communication illustrated in the embodiment of FIG. 13A is related to a movie.

Referring to FIGS. 13A and 13B, based on text messages being exchanged between the users, the electronic device 100 determines that the user may require an application related to accessing the movie (e.g., accessing a movie trailer, a movie clip, a full movie, etc.) and the electronic device 100 identifies relevant video applications in the electronic device 100 which are either installed by the user or pre-installed. The electronic device 100 identifies video applications as secondary applications since the communication was related to a movie. After identifying the video applications, the electronic device 100 may dynamically position the icons of the video secondary applications in the display area 1340 (e.g., ICP) of the screen 102. In an embodiment, the electronic device may select a video application 1360 based on an input, e.g., touch input on one of the icons and render video content provided by the selected video application. After playback of the video content ends or the user stops or pauses playback, the user may close the selected video application. During playback of the video content, the electronic device 100 may display both the instant messaging application and the selected video application at the same time or display only the selected video application. The user may continue communicating with the other user via an instant messaging application during or after playback of the video content.

Figure 14:
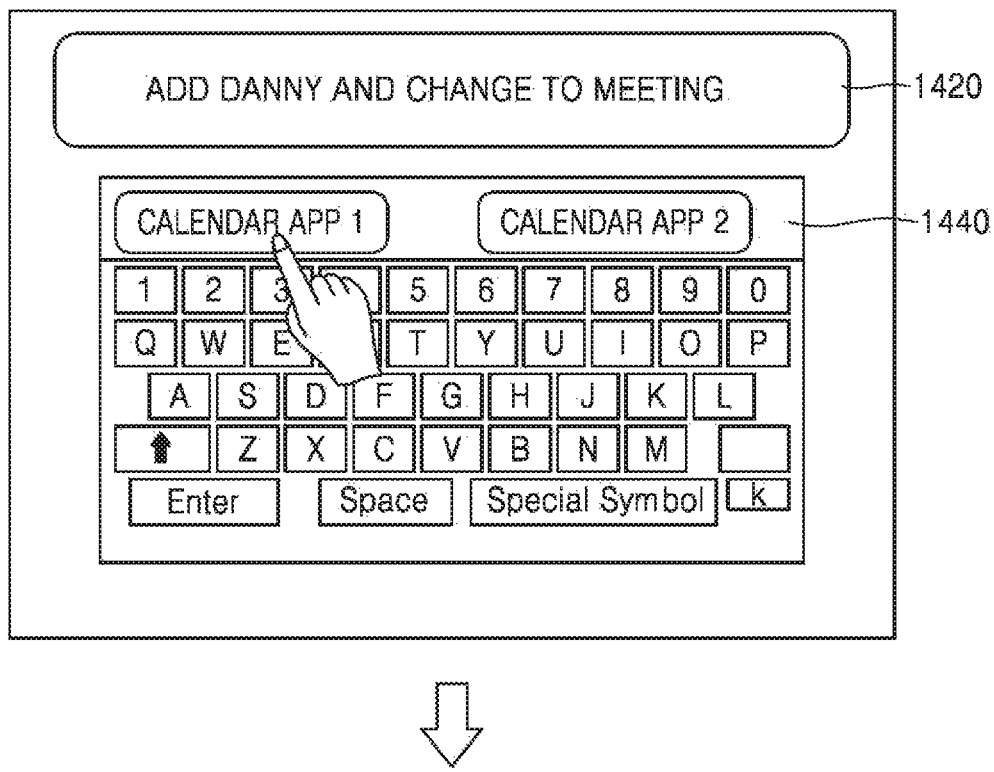
FIG. 14 illustrates embodiments in which a calendar application is identified based on an application displayed on a screen of the electronic device and/or content in the displayed application.
Figure 14:
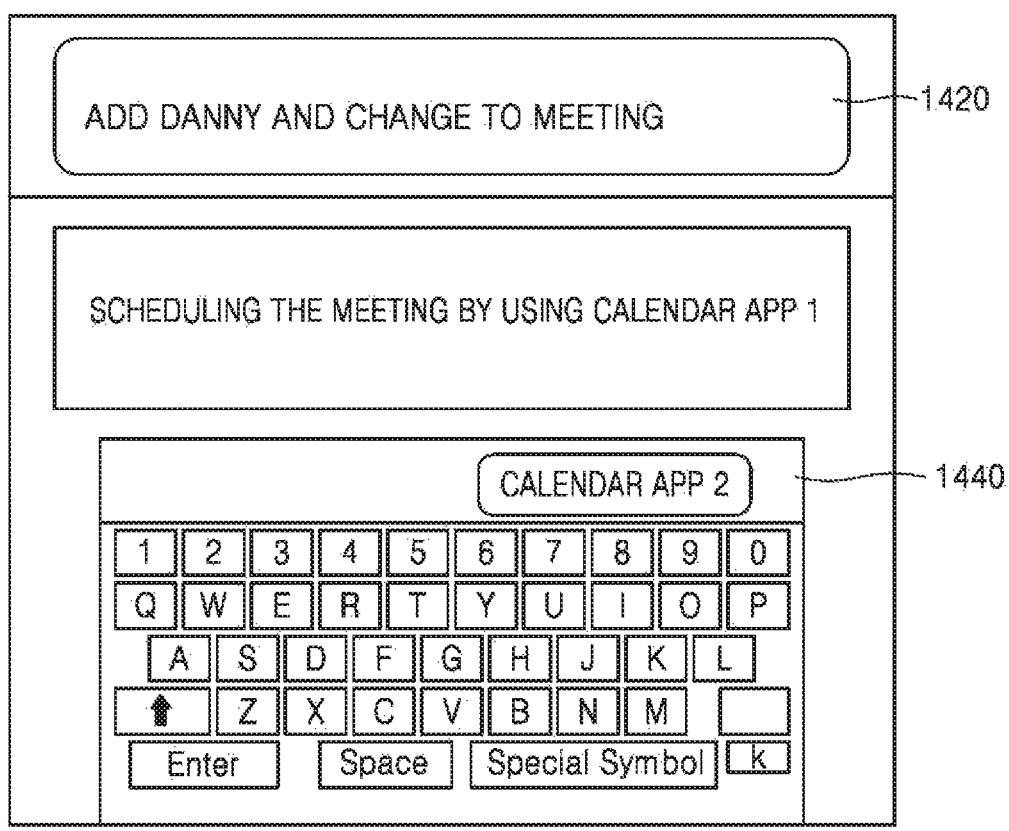

FIGS. 14, 15A, 15B, 16A, and 16B illustrate embodiments in which calendar applications are identified based on an application (e.g., instant messaging application, an email application) displayed in a display area 1420 on the screen 102 of the electronic device 100 and/or content (e.g., text) in the displayed application. In an embodiment, the user of the electronic device 100 is communicating with another user via an instant messaging application. The communication may be voice communication, video communication, text-based communication, or the like. The communication illustrated in FIG. 14 is related to a scheduled meeting.

Referring to FIG. 14, based on text messages being exchanged between the users, the electronic device 100 determines that the user may require an application related to changing details of the scheduled meeting. The electronic device 100 may identify relevant calendar applications in the electronic device 100 which are either installed by the user or pre-installed (for example, pre-installed by the OEM). In an embodiment, the electronic device 100 may identify calendar applications since the communication was related to a meeting. After identifying the calendar applications, the electronic device 100 may dynamically position the icons of the calendar applications in the display area 1440 (e.g., ICP) of the screen 102. In an embodiment, the electronic device 100 may select a calendar application based on an input, e.g., a touch input on one of the icons, invoke the selected calendar application so that the user may quickly send the meeting invite to other user.

Figure 15A:
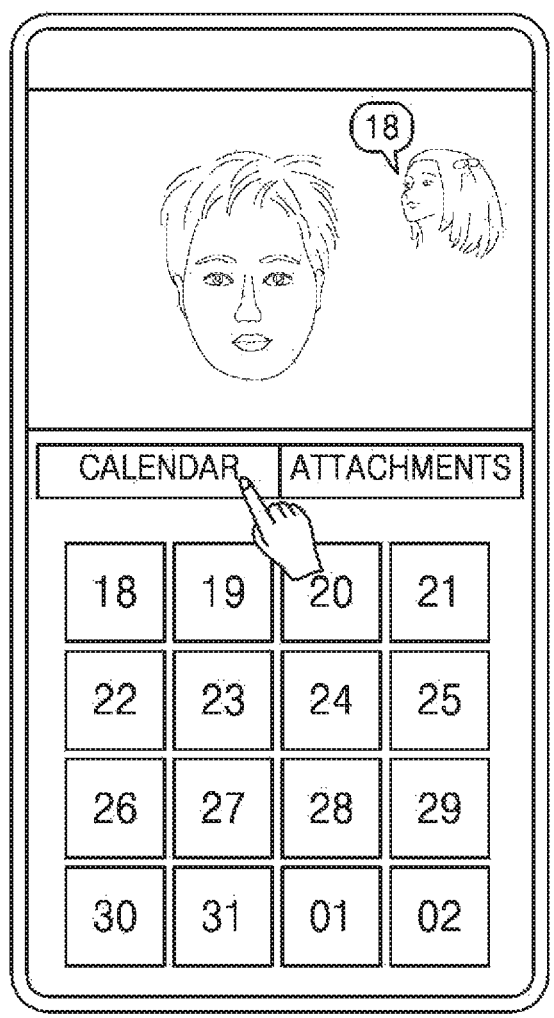
FIGS. 15A and 15B illustrate embodiments in which a calendar application is identified based on an application displayed on a screen of the electronic device and/or content in the displayed application.
Figure 15A:
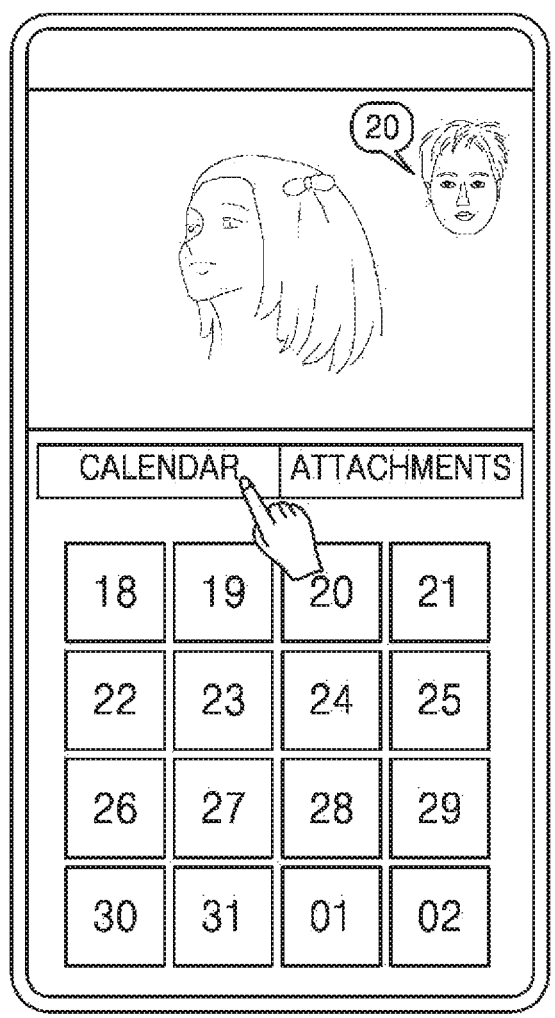
Figure 15B:
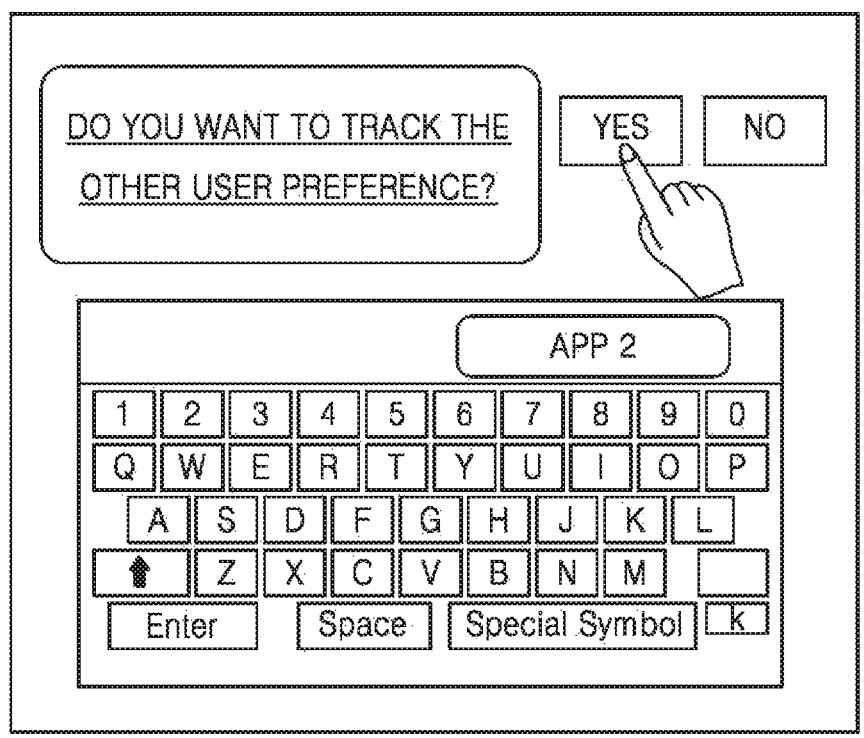

The ICP may automatically be morphed according to the application selected. Referring to FIGS. 15A and 15B, during an interactive session (e.g., a video call session) the calendar application icon is displayed in the ICP. (The populating of the ICP with the calendar application services is already explained with regard to FIG. 14).

Figure 16A:
FIGS. 16A and 16B illustrate embodiments in which a calendar application is identified based on an application displayed on a screen of the electronic device and/or content in the displayed application.
Figure 16B:
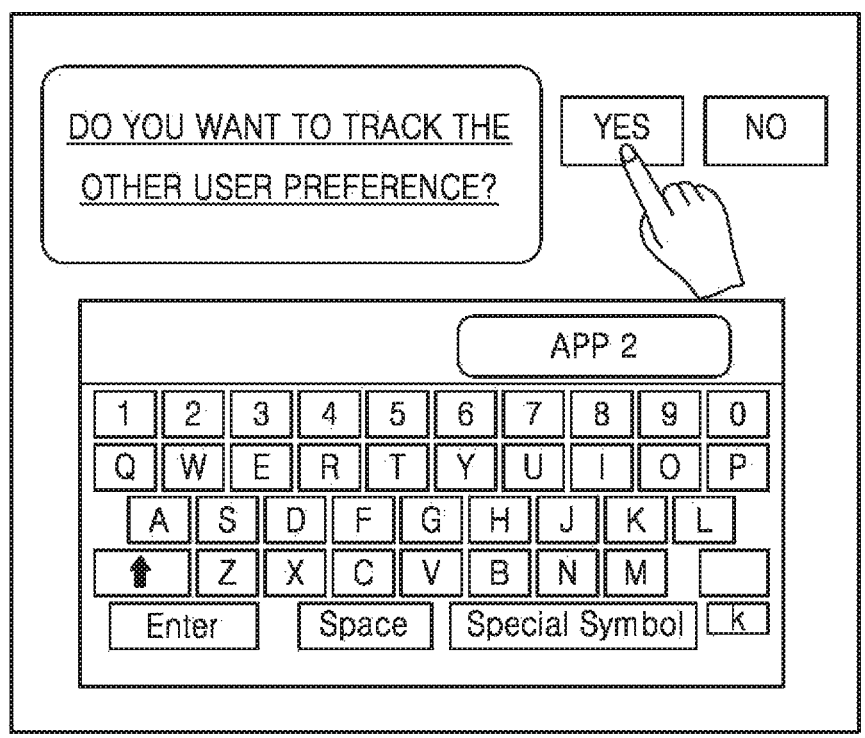

Referring to FIGS. 16A and 16B, during a video call session, the calendar application icon is displayed. Further, both users decide to share their calendars to select a date for a meeting. In an embodiment, the electronic device 100 of the user may dynamically display the date selected by the other user, along with the profile picture of the other user, and vice versa. In another example, the dates selected by both users, along with the profile pictures of each user, may be dynamically displayed on the electronic device 100 of each user.

In an embodiment, the electronic device 100 may obtain consent from respective users to track user preferences during the conversation.

Figure 17:
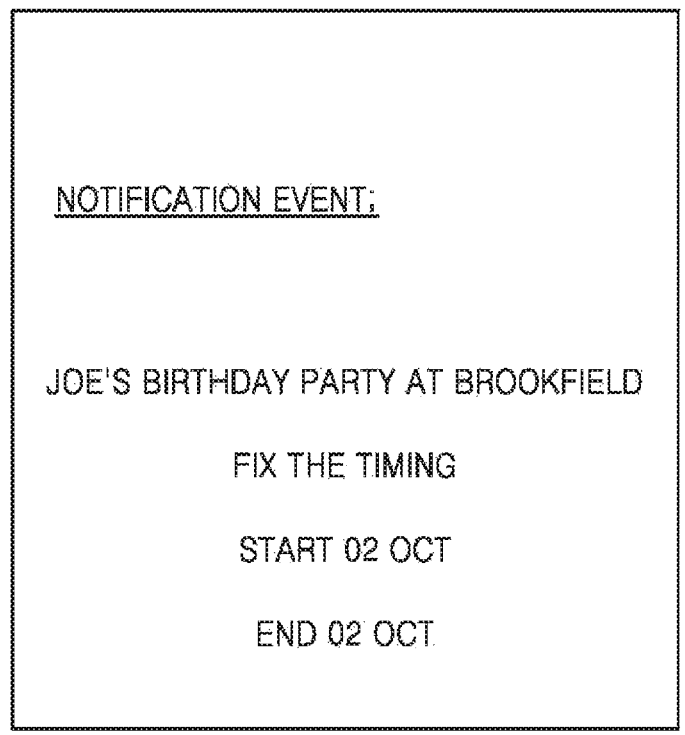
FIG. 17 illustrates an embodiment in which booking applications are identified based on an event notification.
Figure 17:
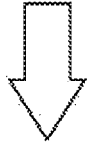
Figure 17:
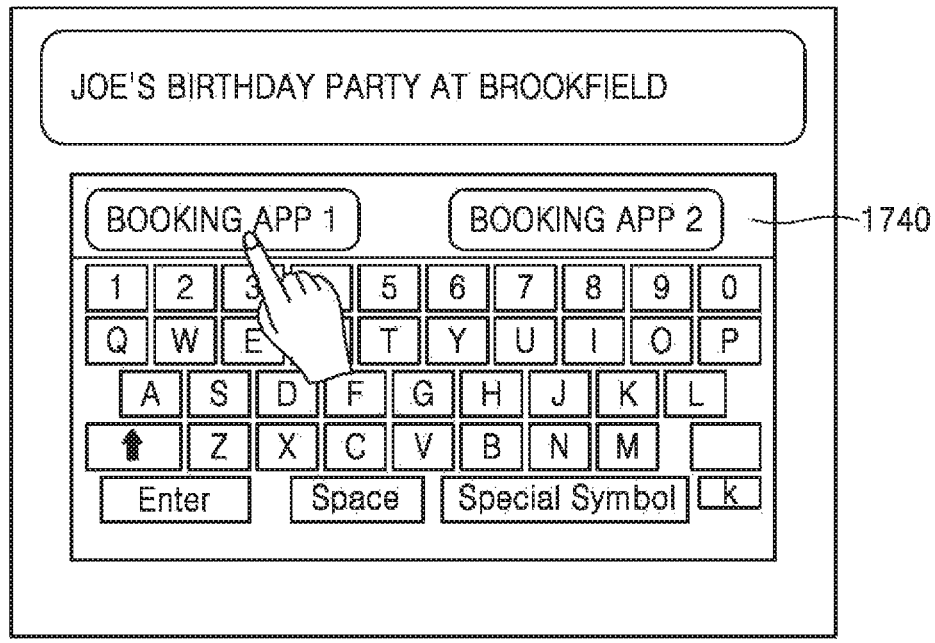

FIG. 17 illustrates an embodiment in which booking applications are identified based on an event notification. In an embodiment, the electronic device 100 sets an event notification for a birthday party for a specified time, and at the specified time, the electronic device 100 alerts the user about the "Birthday party at Brookfield". In an embodiment, the electronic device 100 identifies the location specified in the event notification and the current location of the user, and based on the distance between the locations, accordingly identifies one or more relevant booking applications. In an embodiment, the booking applications may be for a taxi, a train, or the like. After identifying the one or more related booking applications, the electronic device 100 may dynamically position the one or more icons of the related booking applications in a display area 1740 on the screen 102. In an embodiment, the electronic device 100 may select a booking application based on an input, e.g., touch input on one of icons and invoke the selected booking application.

Figure 18:
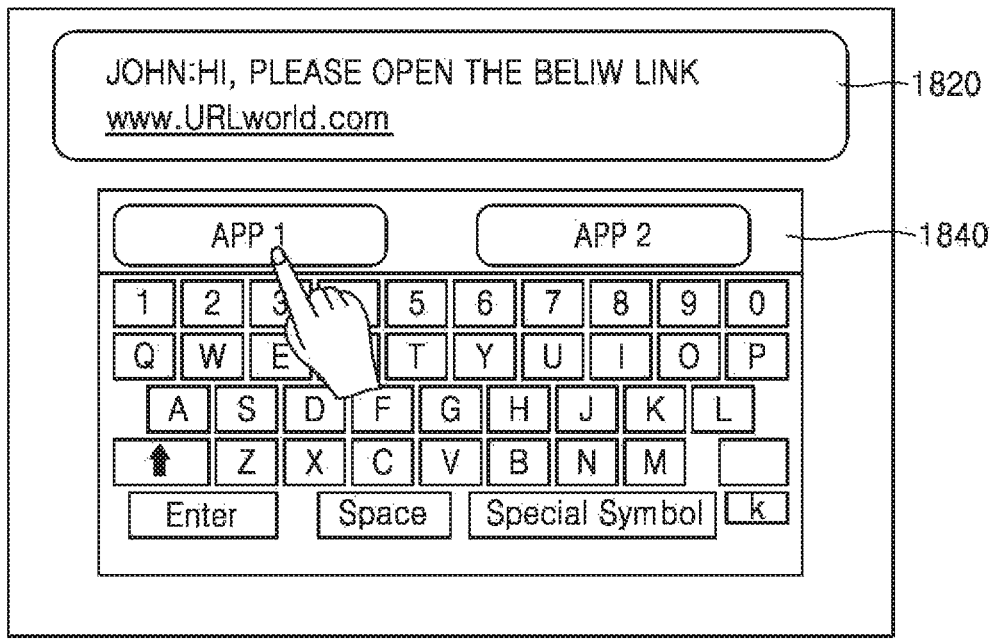
FIG. 18 illustrates an embodiment in which a secondary application is identified based on a clipboard event on a screen of an electronic device.
Figure 18:
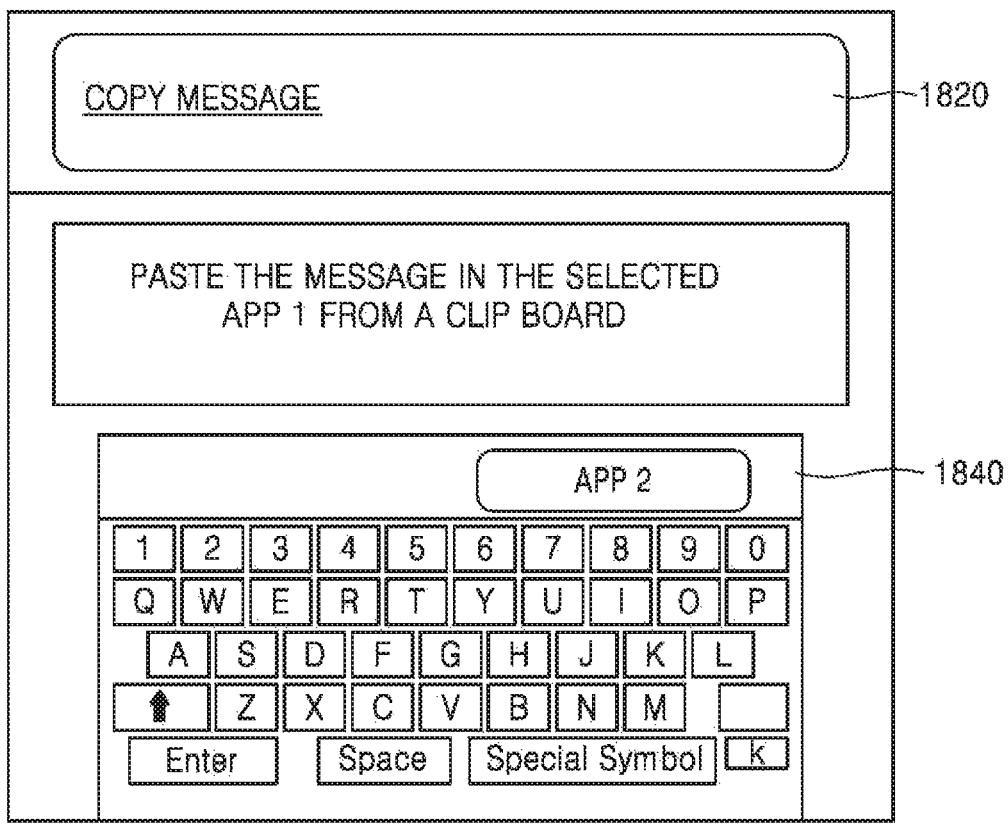

FIG. 18 illustrates an embodiment in which secondary applications are identified based on a clipboard event selected by the user of the electronic device 100. In an example, when the user copies a uniform resource locator (URL) from in a display area 1820 on the screen 102 and wants to paste the same URL in different applications, the electronic device 100 identifies applications related to the copied URL. The electronic device 100 may dynamically position the one or more icons of the secondary applications in a display area 1840 on the screen 102. Then the user selects a secondary application and pastes the copied URL accordingly. In an embodiment, the electronic device 100 may select a secondary application based on an input, e.g., a touch input on one of icons displayed in the display area 1840 and invoke the selected secondary application so that the copied URL is easily pasted to the selected secondary application.

Figure 19:
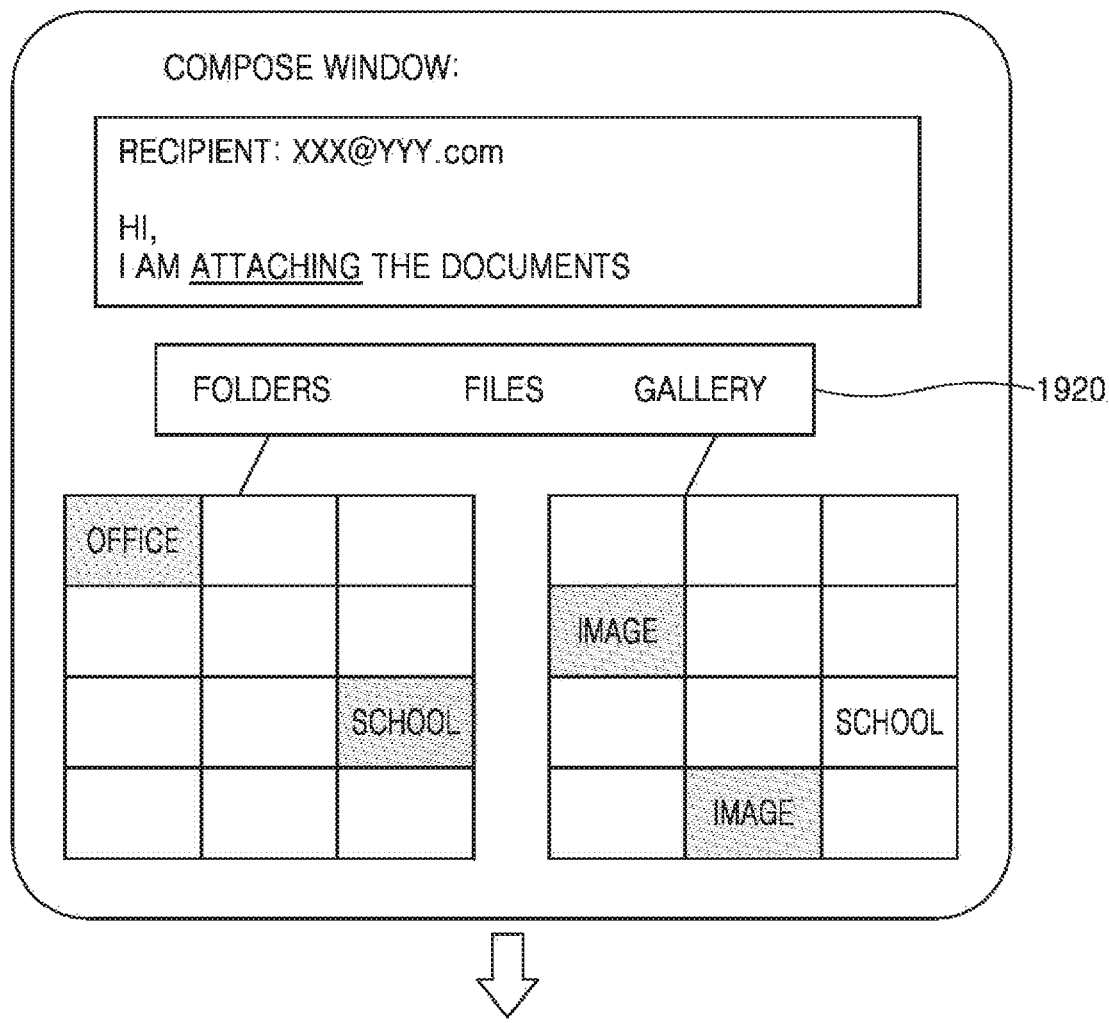
FIG. 19 illustrates an embodiment of dynamically attaching content from different applications during an e-mail service.
Figure 19:
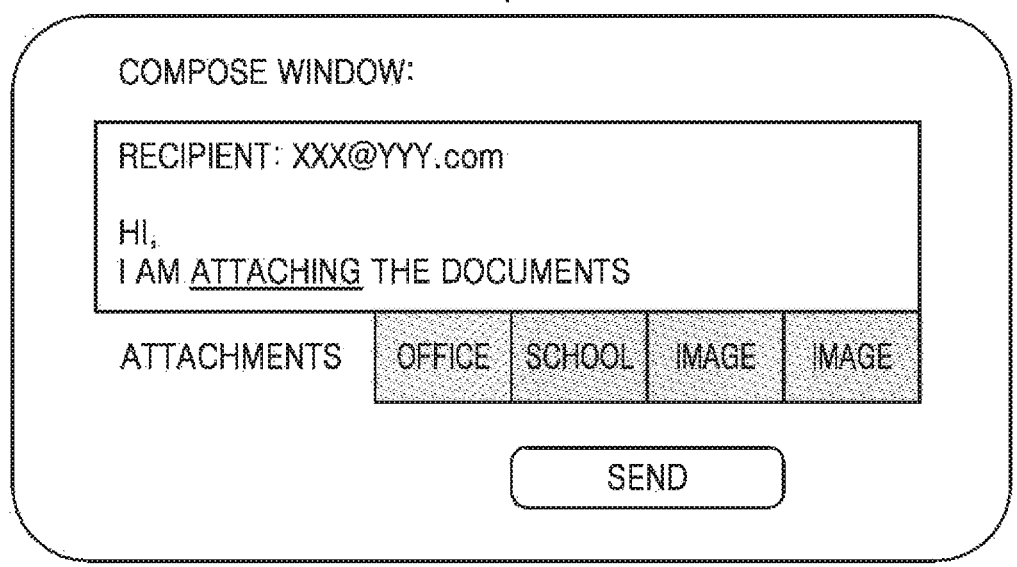

FIG. 19 illustrates an embodiment of dynamically identifying folders and files which are stored in the electronic device 100 and related to content written while composing an email.

Referring to FIG. 19, based on the text (e.g., "attaching") included in the body of the email, the electronic device 100 identifies folders, files, and images/videos and positions a folder icon, a files icon, and a gallery icon in a display area 1920, e.g., in the ICP. The user may then select desired files from the folders or from a general list of files accessible via the files icon and/or select images or music files from the gallery to attach to the email. In the embodiment, the user may browse, select and attach files to the email without switching the screen 102.

In an embodiment, the electronic device 100 identifies and selects a secondary application for managing files, receives an input selecting at least one file via the selected secondary application, sends the at least one file to another electronic device via the selected secondary application, and dynamically associating the at least one file with an application (e.g., email program) executed on the electronic device 100.

Figure 20:
FIG. 20 illustrates an embodiment of comparing and discussing real time services by using an interactive context panel (ICP) to track user preferences.

FIG. 20 illustrates an embodiment of comparing and discussing real time services by using the ICP to track user preferences. In an embodiment, the user of the electronic device 100 is communicating with another user via an instant messaging application. The communication may be voice communication, video communication, text-based communication, or the like. The communication illustrated in FIG. 20 is related to the price of a mobile phone.

Referring to FIG. 20, based on text messages being exchanged between the users, the electronic device 100a determines that the user may require an application related to shopping. In an embodiment, the electronic device 100a identifies relevant shopping applications in the electronic device 100 which are either installed by the user or pre-installed. After identifying shopping applications, the electronic device 100a may display the shopping applications to the user, and select one of the shopping applications based on an input, e.g., a touch input so that the price of the mobile phone may be quickly searched. After identifying the price of the mobile phone in the shopping application, the user may share the price of the mobile phone with the other user, and vice versa. The electronic device 100a of the user may dynamically display the price found by the other user, along with the profile picture of the other user, and vice versa. The electronic device 100a of the user may also display the shopping application in use by the other user, along with the profile picture of the other user, and vice versa.

In an embodiment, the ICP allows the real time services to be compared and discussed to track user's preference.

Figure 21:
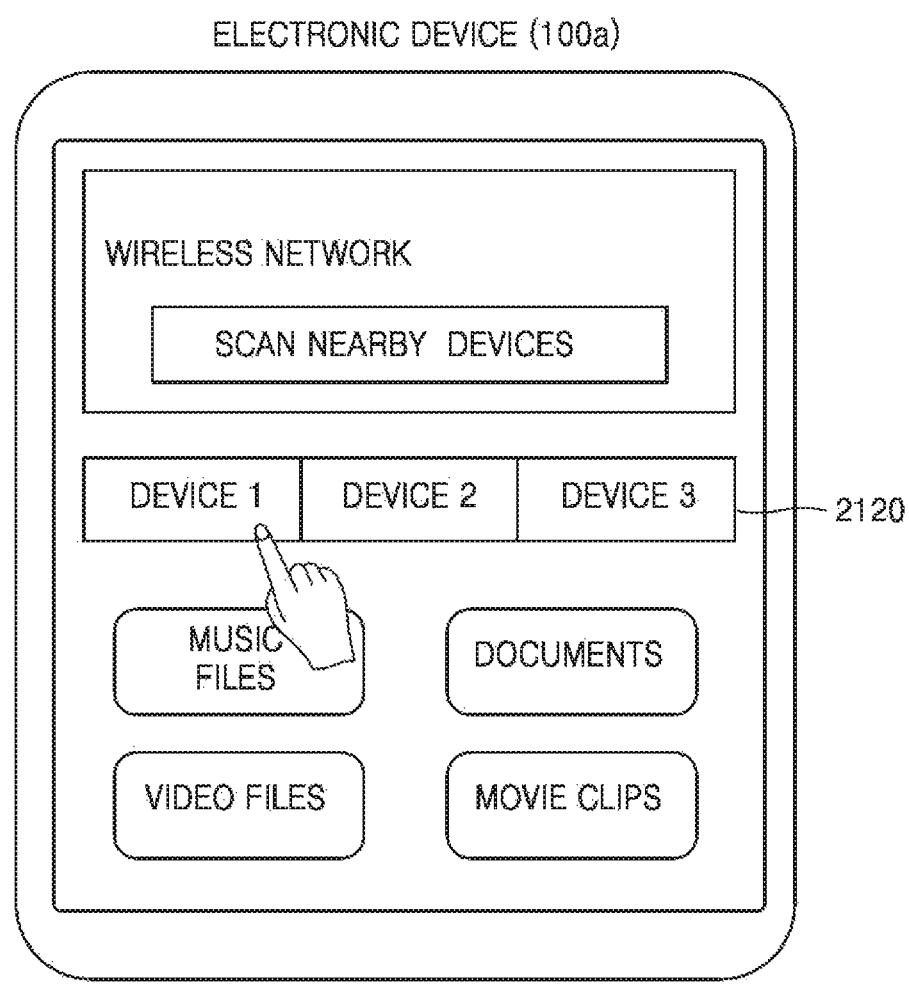
FIG. 21 illustrates an embodiment of providing a representation of nearby electronic devices on a screen of an electronic device.

FIG. 21 illustrates an embodiment of providing a representation of nearby electronic devices on the screen 102 of the electronic device 100a. The electronic device 100a may detect nearby electronic devices in the vicinity thereof using existing techniques. After detecting nearby electronic devices, the electronic device 100a provides representations of the nearby electronic devices in a display area 2120 on the screen 102 of the electronic device 100a. Each of the representations may be, for example, an icon, a symbol, an image, text, or the like, but are not limited thereto. In an embodiment, in response to a user input selecting a representation of one of the nearby electronic devices, the electronic device 100a may transfer content to the nearby electronic device.

Referring to FIG. 21, the electronic device 100 identifies at least one secondary application by detecting at least one neighboring electronic device within a proximity of the electronic device 100a, i.e. within a predetermined distance from the electronic device 100a, and providing at least one representation of the at least one neighboring electronic device on the electronic device 100.

Figure 22:
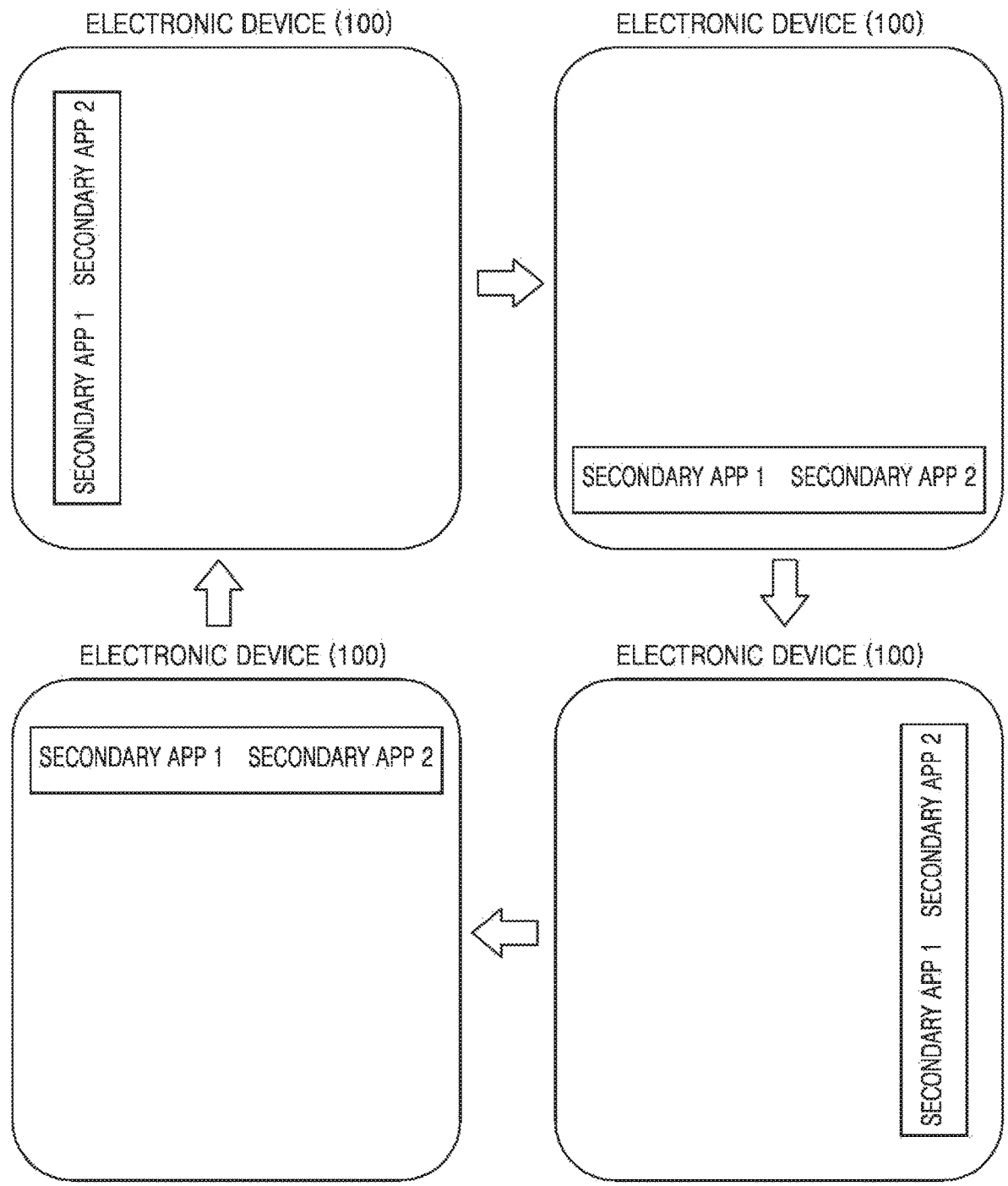
FIG. 22 illustrates an embodiment of rotating or repositioning an ICP displayed on a screen of an electronic device.

FIG. 22 illustrates an embodiment of rotating or repositioning an ICP displayed on a screen of an electronic device.

Referring to FIG. 22, the ICP may be rotated or repositioned on the screen 102 of the electronic device 100 as illustrated in FIG. 22, but is not limited thereto. Although not illustrated, the ICP may also be, for example, resized or reshaped.

Figure 23:
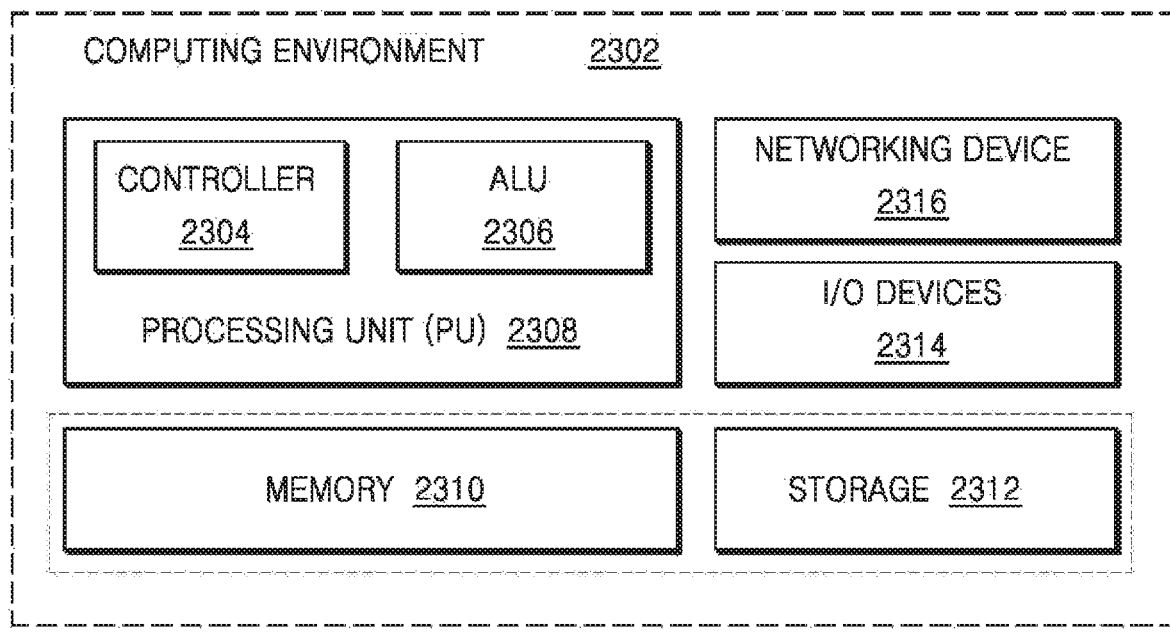
FIG. 23 illustrates a computing environment implementing a method of dynamically positioning a representation of a secondary application on a screen of an electronic device, according to various embodiments of the present disclosure.

FIG. 23 illustrates a computing environment 2302 implementing a method of dynamically positioning a representation of one or more secondary applications on the screen 102 of the electronic device 100, according to embodiments disclosed herein. As illustrated in the FIG. 23, the computing environment 2302 includes at least one processor or processing unit (PU) 2308 that is equipped with a controller 2304, an arithmetic logic unit (ALU) 2306, a memory 2310, a storage 2312, a plurality of networking devices 2316 and a plurality input output (I/O) devices 2314. The processor 2308 is responsible for processing the instructions of the algorithm according to commands which the processor 2308 receives from the controller 2304 in order. Further, any logical and arithmetic operations involved in the execution of the instructions are processed with the help of the ALU 2306.

Referring to FIG. 23, the overall computing environment 2302 may be composed of multiple homogeneous and/or heterogeneous cores, multiple central processing units (CPUs) of different kinds, special media and other accelerators. The processor 2308 is responsible for processing the instructions of the algorithm. Further, the plurality of processor 2308 may be located on a single chip or multiple chips.

The algorithm comprising instructions and codes required for implementing the various embodiments described herein are stored in the memory 2310, the storage 2312, or a combination thereof. At the time of execution, the instructions may be fetched from the corresponding memory 2310 and/or storage 2312, and executed by the processor 2308.

In the case of hardware implementations, various networking devices 2316 or external I/O devices 2314 may be connected to the computing environment 2302 to support the hardware implementations.

The embodiments disclosed herein may be implemented through at least one software program running on at least one hardware device and performing network management functions to control elements of the at least one hardware device. The elements illustrated in at least FIGS. 1A, 1B, 1C, 2A, 2B and 23 include blocks which may be at least one of a hardware device or a combination of hardware device and one or more software modules.

The foregoing description of the specific embodiments fully discloses the general nature of the embodiments herein that others can, by applying current knowledge, readily modify and or adapt for various applications such specific embodiments without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the embodiments as described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for managing applications on an electronic device, the method comprising:
   identifying, by the electronic device, at least one secondary application related to content included in or operated in a primary application executed on the electronic device,
   wherein the content includes at least one of a textual content, a graphical content, or a voice, and
   wherein a context of the content is related to the at least one secondary application;
   displaying, by the electronic device, at least one representation corresponding to the at least one secondary application on a screen of the electronic device;
   selecting, by the electronic device, one of the at least one representation based on an input;
   invoking, by the electronic device, one of the at least one secondary application corresponding to the selected representation on the electronic device; and
   displaying the invoked secondary application on one of multi windows of the screen and the primary application on another one of the multi windows and performing an action related to the content of the primary application using the invoked secondary application,
   wherein the performing of the action comprises automatically inputting at least part of the content included in the primary application to the invoked secondary application,
   wherein the at least part of the content included in or operated in the primary application is auto-populated in the displayed invoked secondary application, and
   wherein the performing of the action comprises providing, after completing the action via the invoked secondary application, a notification to choose continuing using the invoked secondary application, returning to a single window display of the primary application or using a supplemental application.

2. The method of claim 1, wherein the displaying the at least one representation comprises dynamically positioning the at least one representation within a portion of the screen of the electronic device.

3. The method of claim 1, further comprising:
   performing, by the electronic device, an action via the selected secondary application; and
   invoking, by the electronic device, a supplemental application for the secondary application when the action is completed.

4. The method of claim 1, further comprising:
   receiving, by the electronic device and via the secondary application, an input selecting at least one file;
   sending, by the electronic device, the at least one file to another electronic device via the secondary application; and
   dynamically associating, by the electronic device, the at least one file with the primary application.

5. The method of claim 1, further comprising:
   selecting, by the electronic device, an application content in a selected secondary application;
   dynamically associating, by the electronic device, the selected application content with a portion of the primary application;
   receiving, by the electronic device, an input in the selected application content associated with the portion of the primary application; and
   rendering, by the electronic device, the selected application content on a screen of the electronic device.

6. The method of claim 1, further comprising:
   representing, by the electronic device, one of the at least one secondary application and the at least one of the primary application on a multi window on a screen of the electronic device.

7. The method of claim 1, further comprising:
   automatically identifying, by the electronic device an application content in the secondary application; and
   dynamically associating, by the electronic device, the identified application content with a portion of the primary application.

8. The method of claim 1, wherein the identifying of the at least one secondary application comprises:
   determining whether the at least one secondary application corresponds to the content included in the primary application.

9. The method of claim 1, wherein the identifying of the at least one secondary application comprises:
   detecting at least one neighboring electronic device within a proximity of the electronic device; and
   providing a representation of the at least one neighboring electronic device on the electronic device.

10. The method of claim 1, further comprising:
    providing, by the electronic device, a notification for choosing whether to continue using the secondary application, return to the displayed representation, use a supplemental application, or automatically returning to a single window display of the primary application after completing the action via the invoked secondary application.

11. The method of claim 1, further comprising:
    invoking, by the electronic device, at least one supplemental application related to a secondary content included in or operated in the invoked secondary application when the action is performed.

12. The method of claim 1, wherein the displaying at least one representation comprises:
    displaying, by the electronic device, an interactive context panel (ICP) including the at least one representation on the screen of the electronic device,
    wherein the ICP can be rearranged on the screen based on at least one of a movement of the electronic device and a user input.

13. The method of claim 1, wherein the content is being exchanged with at least one other electronic device via the primary application executed on the electronic device.

14. An electronic device for managing applications, comprising:
    a display;
    at least one processor; and
    at least one memory storing one or more computer programs configured to be executed by the at least one processor, wherein the one or more computer programs include instructions to cause the electronic device to at least:
- identify at least one secondary application related to content included in or operated in a primary application executed on the electronic device,
  - wherein the content includes at least one of a textual content, a graphical content, or a voice, and
  - wherein a context of the content is related to the at least one secondary application,
- display at least one representation on an interactive context panel (ICP) corresponding to the at least one secondary application on a screen of the display,
- select one of the at least one representation based on an input,
- invoke one of the at least one secondary application corresponding to the selected representation on the electronic device,
- display the invoked secondary application on one of multi windows of the screen and the primary application on another one of the multi windows, and
- perform an action related to the content of the primary application using the invoked secondary application,
- wherein the performing the action comprises automatically providing at least part of the content included in or operated in the primary application to the invoked secondary application,
- wherein the at least part of the content included in or operated in the primary application is auto-populated in the displayed invoked secondary application, and
- wherein the performing the action comprises providing, after completing the action via the invoked secondary application, a notification to choose continuing using the invoked secondary application, returning to a single window display of the primary application or using a supplemental application.

15. The electronic device of claim 14, wherein the one or more computer programs further include instructions to at least:
- dynamically position the at least one representation within a portion of a screen of the electronic device.

16. The electronic device of claim 14, wherein the one or more computer programs further include instructions to at least:
- perform an action via the selected secondary application, and
- invoke a supplemental application for the secondary application when the action is completed.

17. The electronic device of claim 14, wherein the one or more computer programs further include instructions to at least:
- receive, via the secondary application, an input selecting at least one file,
- send the at least one file to another electronic device via the secondary application, and
- dynamically associate the at least one file with the primary application.

18. The electronic device of claim 14, wherein the one or more computer programs further include to at least:
- select an application content in a selected secondary application,
- dynamically associate the selected application content with a portion of the primary application,
- receive an input in the selected application content associated with the portion of the primary application, and
- render the selected application content on a screen of the electronic device.

19. The electronic device of claim 14, wherein the one or more computer programs further include to at least:
- automatically identify an application content in the secondary application, and
- dynamically associate the identified application content with a portion of the primary application.

20. A non-transitory computer readable storage medium, comprising:
- at least one processor; and
- at least one memory storing computer program instructions configured, when executed by the at least one processor, to cause an electronic device at least to perform:
  - identifying, by the electronic device, at least one secondary application related to content included in or operated in a primary application executed on the electronic device,
    - wherein the content includes at least one of a textual content, a graphical content, or a voice, and
    - wherein a context of the content is related to the at least one secondary application,
  - displaying, by the electronic device, at least one representation corresponding to the at least one secondary application on a screen of the electronic device,
  - selecting, by the electronic device, one of the at least one representation based on an input,
  - invoking, by the electronic device, one of the at least one secondary application corresponding to the selected representation on the electronic device,
  - displaying the invoked secondary application on one of multi windows of the screen and the primary application on another one of the multi windows, and
  - performing an action related to the content of the primary application using the invoked secondary application,
  - wherein the performing the action comprises automatically inputting at least part of the content included in the primary application to the invoked secondary application,
  - wherein the at least part of the content included in or operated in the primary application is auto-populated in the displayed invoked secondary application, and
  - wherein the performing the action comprises providing, after completing the action via the invoked secondary application, a notification to choose continuing using the invoked secondary application, returning to a single window display of the primary application or using a supplemental application.

* * * * *